United States Patent
Toner

(10) Patent No.: US 9,970,611 B2
(45) Date of Patent: May 15, 2018

(54) FLAGPOLE ILLUMINATION DEVICE

(71) Applicant: Gary L. Toner, Lancaster, NY (US)

(72) Inventor: Gary L. Toner, Lancaster, NY (US)

( * ) Notice: Subject to any disclaimer, the term of this patent is extended or adjusted under 35 U.S.C. 154(b) by 531 days.

(21) Appl. No.: 14/677,489

(22) Filed: Apr. 2, 2015

(65) Prior Publication Data
US 2015/0211720 A1    Jul. 30, 2015

Related U.S. Application Data

(63) Continuation-in-part of application No. 13/940,878, filed on Jul. 12, 2013, now Pat. No. 9,523,484.
(Continued)

(51) Int. Cl.
| | |
|---|---|
| *F21S 9/03* | (2006.01) |
| *F21V 33/00* | (2006.01) |
| *F21S 8/00* | (2006.01) |
| *F21S 8/08* | (2006.01) |
| *F21V 17/02* | (2006.01) |

(Continued)

(52) U.S. Cl.
CPC .............. *F21S 9/032* (2013.01); *F21V 17/02* (2013.01); *F21V 21/0824* (2013.01); *F21V 21/116* (2013.01); *F21V 33/00* (2013.01); *G09F 13/02* (2013.01); *G09F 17/00* (2013.01); *E04H 12/32* (2013.01); *F21S 8/03* (2013.01); *F21S 8/032* (2013.01); *F21S 8/033* (2013.01); *F21S 8/036* (2013.01); *F21S 8/08* (2013.01); *F21S 9/037* (2013.01); *F21V 5/04* (2013.01); *F21V 21/14* (2013.01); *F21V 21/30* (2013.01); *F21V 21/32* (2013.01); *F21W 2131/10* (2013.01); *F21W 2131/103* (2013.01); *F21Y 2115/10* (2016.08); *Y02B 20/72* (2013.01); *Y10T 29/49117* (2015.01)

(58) Field of Classification Search
CPC .. F21S 9/032; F21S 9/035; F21S 8/036; F21S 8/086; F21S 8/081; F21V 21/34; F21V 21/30; F21V 21/32; F21V 21/116; F21V 21/14; F21V 21/0824; F21V 21/26
USPC ........ 362/427, 431; 248/298.1, 285.1, 286.1, 248/287.1
See application file for complete search history.

(56) References Cited

U.S. PATENT DOCUMENTS

| | | | | |
|---|---|---|---|---|
| 3,104,064 | A * | 9/1963 | Bellek | F21S 8/081 362/267 |
| 7,217,015 | B2 * | 5/2007 | Cocciardi | F21V 21/088 248/231.71 |

(Continued)

*Primary Examiner* — William N Harris
(74) *Attorney, Agent, or Firm* — Del Vecchio and Stadler LLP

(57) ABSTRACT

An illumination device having a pole mount, a light support that extends from the pole mount, a lighting unit is connected to the pole mount, and a solar panel assembly is mounted to the lighting unit. In another embodiment an illumination apparatus is provided having a pole mount and a lighting assembly, and the pole mount has a first clamp half and a second clamp half. In another preferred embodiment there is flexible lighting assembly comprising a mount that is connected to a slider bar that supports a slider. A light support arm is supported on the slider and the light support arm connects to a central support member. A flexible member extends from the central support member to a telescopic lighting assembly having a light-generating device. A solar unit is connected to the slider bar and is wired to and powers the light-generating device.

18 Claims, 27 Drawing Sheets

Related U.S. Application Data

(60) Provisional application No. 61/710,044, filed on Oct. 5, 2012, provisional application No. 61/671,154, filed on Jul. 13, 2012.

(51) Int. Cl.

| | | |
|---|---|---|
| *F21V 21/08* | (2006.01) | |
| *F21V 21/116* | (2006.01) | |
| *F21V 21/30* | (2006.01) | |
| *F21W 131/10* | (2006.01) | |
| *F21W 131/103* | (2006.01) | |
| *F21V 21/14* | (2006.01) | |
| *F21V 21/32* | (2006.01) | |
| *G09F 13/02* | (2006.01) | |
| *G09F 17/00* | (2006.01) | |
| *F21V 5/04* | (2006.01) | |
| *E04H 12/32* | (2006.01) | |
| *F21Y 115/10* | (2016.01) | |

(56) References Cited

U.S. PATENT DOCUMENTS

| | | | |
|---|---|---|---|
| 8,371,730 B2 * | 2/2013 | Mitchell | B60Q 1/0483 362/396 |
| 2004/0228123 A1 * | 11/2004 | Stewart | F21S 9/032 362/183 |
| 2005/0103378 A1 * | 5/2005 | Pu | F21S 9/032 136/244 |
| 2007/0002561 A1 * | 1/2007 | Tesmer | F21S 9/035 362/183 |
| 2007/0084500 A1 * | 4/2007 | Chen | F16M 11/14 136/244 |
| 2008/0247155 A1 | 10/2008 | Allsop et al. | |
| 2009/0040774 A1 * | 2/2009 | Avila | F21V 21/28 362/371 |
| 2009/0190356 A1 * | 7/2009 | Kauffman | F21S 8/081 362/282 |
| 2010/0102185 A1 | 4/2010 | Jenestreet | |
| 2010/0302765 A1 | 12/2010 | Yu et al. | |
| 2012/0206276 A1 * | 8/2012 | Cai | G08G 1/095 340/907 |
| 2014/0085909 A1 | 3/2014 | Ahn | |

* cited by examiner

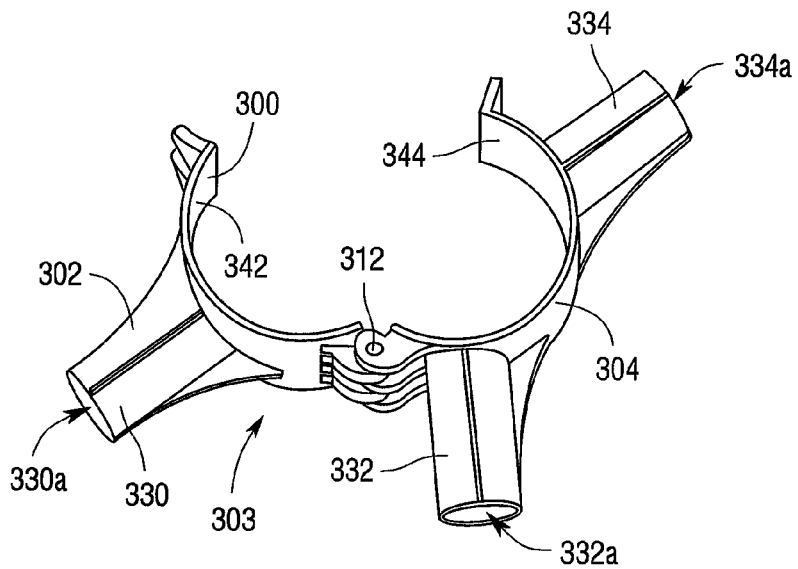
Fig.14
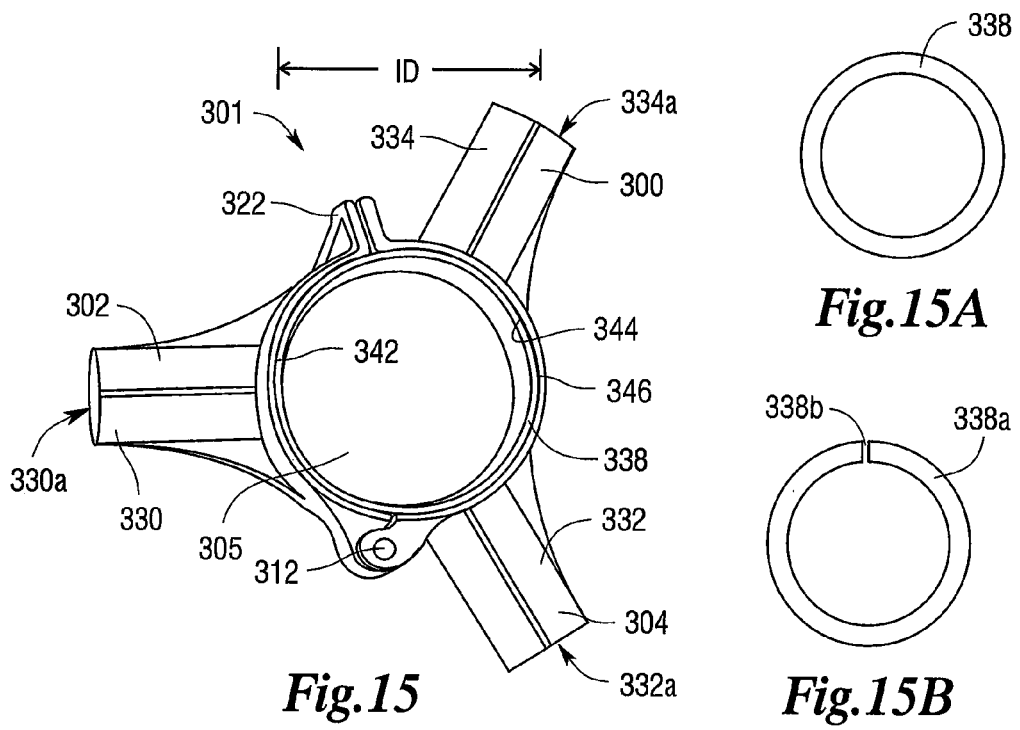
Fig.15
Fig.15A
Fig.15B

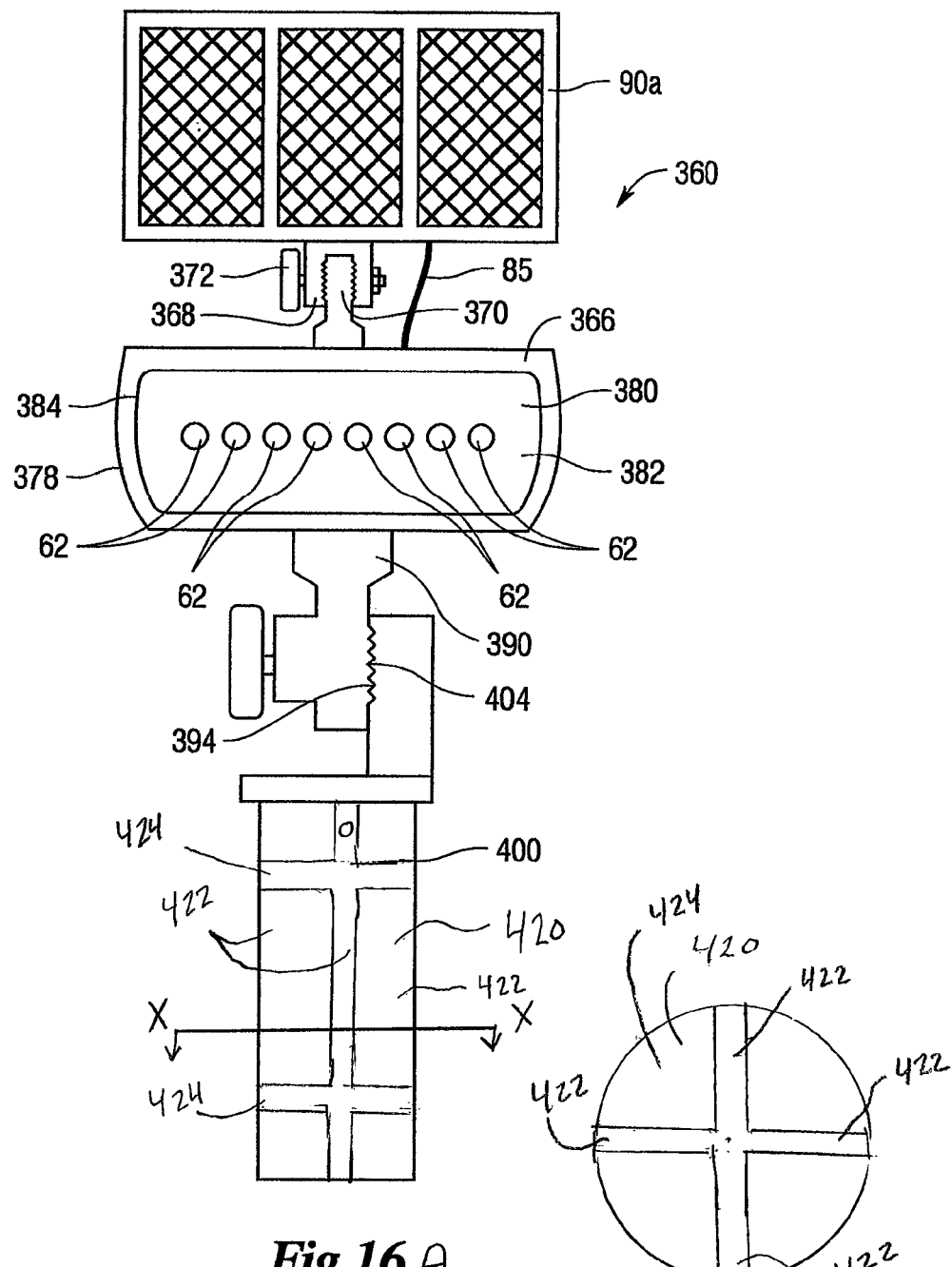

FLAGPOLE ILLUMINATION DEVICE

CROSS REFERENCE TO RELATED APPLICATIONS

This is a continuation in part of U.S. patent application Ser. No. 13/940,878 filed on Jul. 12, 2013 and this application claims the benefit of U.S. Provisional Patent Application 61/671,154 filed on Jul. 13, 2012 and claims the benefit of U.S. Provisional Patent Application 61/710,044 filed on Oct. 5, 2012 and the contents and disclosures of each are hereby incorporated herein by reference.

BACKGROUND

Many houses, businesses and governmental offices display the American flag. Oftentimes it is desirable to fly the flag during the nighttime hours. Of course, flag etiquette demands that when the American flag is flown during the nighttime hours it is to be properly illuminated. Presently, nighttime illumination of the flag is accomplished by mounting lights on the ground or nearby structures or buildings. One of the problems with keeping with proper flag etiquette is that the lights must be on during the entire night and this is expensive because of the amount of electrical power consumed. Indeed, some flag illumination systems are for only a limited amount of time and actually are turned off during a portion of the night to conserve on power costs.

In addition, homeowners and businesses have a need to provide lighting on their grounds, but do not want to expend the time and funds to have professionals, for example electricians, install the lighting, wiring and lighting fixtures.

Thus, there is a need for lighting device that is inexpensive and reliable, and capable of being installed by the homeowner or business, such that grounds (backyards, parking lots, buildings) or the American flag can be illuminated at nighttime.

SUMMARY

An illumination device is provided having a pole mount with a light support extending from the pole mount and a lighting unit is connected to the pole mount. A solar panel assembly is mounted to the lighting unit wherein the pole mount is adapted to be fitted to poles having different diameters. The lighting unit is rotatable relative to the light support and pole mount, and the solar panel assembly is rotatable relative to the lighting unit.

In another preferred embodiment an illumination apparatus having a pole mount clamp and a lighting assembly is provided. The pole mount clamp has a first clamp half and a second clamp half. A hinge joins the first half and the second clamp half together, and the first clamp half and the second clamp half are movable toward and away from one another to an open clamp position and to a closed clamp position. When in the closed clamp position the pole mount clamp defines a pole opening. A first light support extends from the first clamp half, and second and a third light supports extend from the second clamp half. A light emitting assembly is supported by each of the first, second and third light supports. The light emitting assembly includes a solar panel and a rechargeable battery pack and includes a light emitting diode component having at least one light emitting diode, and the light emitting diode component is capable of being powered by the rechargeable battery pack.

In another preferred embodiment there is a supported illumination device wherein an arm mount is provided that is capable of supporting the lighting assembly from a flat surface, for example a wall, a tree or a floor of a building.

In another preferred embodiment a spike supported illumination device having a ground spike and the ground spike has a spike insertion portion and an opposed spike portion. An extension member is provided and is adapted to receive the spike insertion portion and an arm insertion portion of the lighting assembly such that the light emitting assembly is elevated with respect to the surround ground. For even more elevation of the lighting assembly the extension members are used with connector members that hold the extension members together. The connector members and extension members can also be used in connection with the lighting assembly and the pole mount clamp such that the lighting assembly is spaced a distance away from the pole mount. This provides the user with the option of support the lighting assembly a distance away from the pole such to provide different types of lighting arrangements.

In another preferred embodiment there is a flexible lighting assembly comprising an assembly mount connected to a slider bar. A slider is supported on the slider bar and the slider is capable being moved back and forth along the slider bar. The slider is capable of being fixed in place on the slider bar by the user when in a desired position.

A light support arm is supported on and extends from the slider such that it moves with the slider. A central support member is connected to the light support arm and the central support arm and the light support arm and the central support member are capable of being adjusted relative to one another and then locked in position.

The central support member is connected to a flexible member. The flexible member is capable of being adjusted relative to the central support member by the user until in a desired position. The flexible member remains in that position until moved again by the user.

A telescopic lighting assembly connected to flexible connector member. The telescopic lighting assembly includes an outer housing and an inner element, and has a light generating device component, for example a light emitting diode.

A solar unit assembly having a rechargeable battery and a solar panel is connected to the slider bar and is wired to the light-generating device to power the light-generating device. The solar unit is adjustable relative to the slider bar.

BRIEF DESCRIPTION OF THE DRAWING FIGURES

FIG. 1 is a top plan view of an illumination device.
FIG. 2 is a perspective view of a pole mount.
FIG. 2A is a front elevational view of the pole mount as it is being installed on a flagpole.
FIG. 2B is a front elevational view of the mount installed on a flagpole.
FIG. 3 is a front elevational view of a light support.
FIG. 3A is a right end view of the light support.
FIG. 3B is a left end view of the light support.
FIG. 3C is a top plan view of the light support.
FIG. 4 is a front elevational view of the illumination device.
FIG. 5 is a front elevational view of the lighting unit.
FIG. 6 is a top view of the lighting unit.
FIG. 7 is a front elevational view of a solar panel assembly.
FIG. 8 is a left side view of the solar panel assembly.
FIG. 9 is a front view of the illumination device in use.
FIG. 10 is another embodiment of an illumination device.

FIG. 14 is a top perspective view of the pole mount clamp is an open position from a different angle than that shown in FIG. 13.

FIG. 15 is a top plan view of the pole mount clamp.

FIG. 15A is a top plan view of a ring insert.

FIG. 15B is a top plan view of a split ring insert.

FIG. 16A is a front view of another embodiment of the light emitting assembly that is capable of being supported by the pole mount clamp having a shaped insertion portion.

FIG. 16B is a section view of FIG. 16A taken along line X-X of FIG. 16A.

DESCRIPTION

Figure 1:
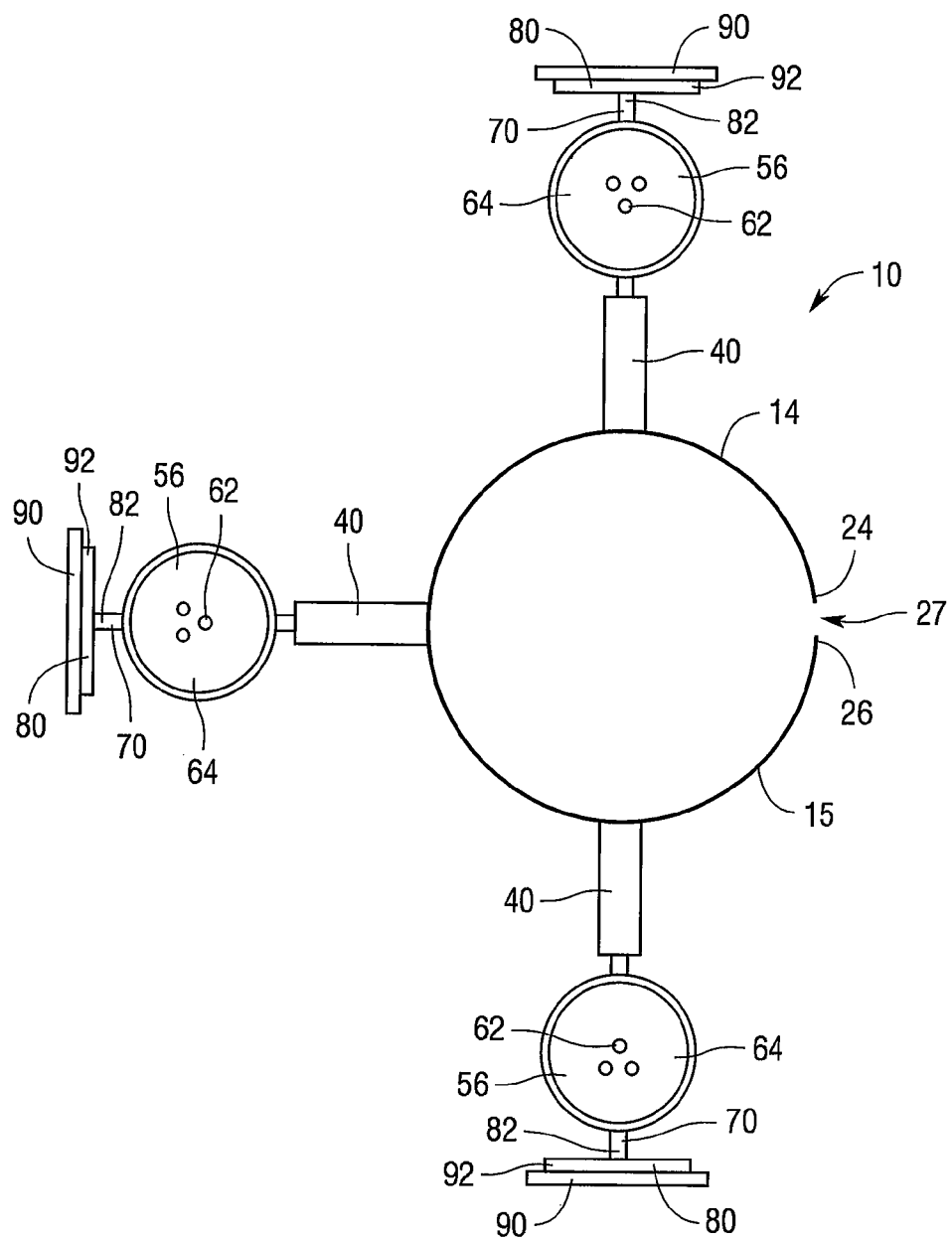

FIG. 1 is a top plan view of the illumination device 10 for illuminating, for example, a flag 102 supported on a pole 100 (shown in FIG. 9), and the pole 100 may embodied to be virtually any pole including a flagpole 101. The pole 100 is supported in the ground 99.

Figure 2:
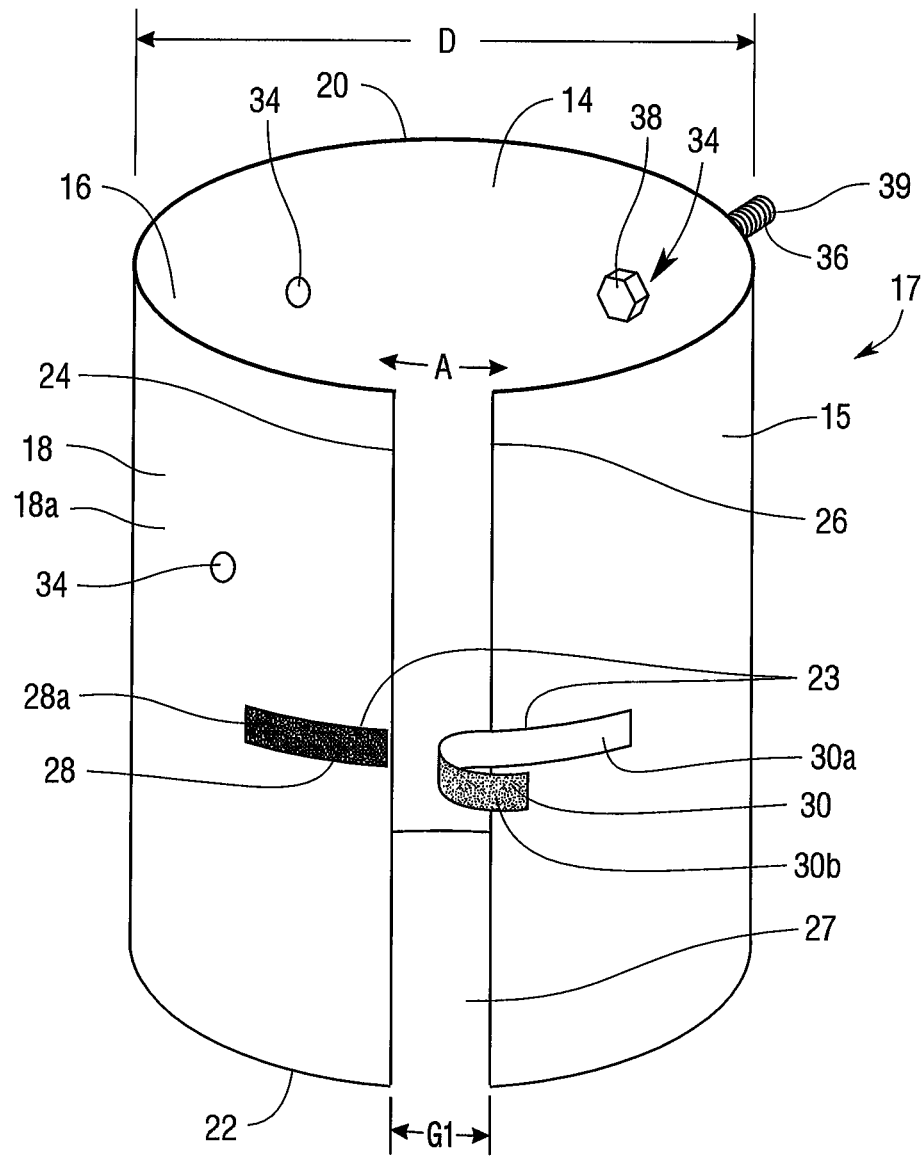

As shown in FIG. 2 the illumination device 10 includes a pole mount 14 that has a cylindrical shape and has a surrounding sidewall 15 and facing first and second gap edges 24, 26. When the facing first and second gap edges 24, 26 abut one another the pole mount 14 has an internal diameter designated D in FIG. 2 of about four inches. It is to be understood that the diameter D can be embodied to have any diameter required for a particular application, that is, to fit around poles 100 having different diameters D. For example, the diameter D of the pole mount 14 can be one inch to four inches. The pole mount 14 is made of a flexible material, for example flexible polyvinyl chloride (PVC), flexible plastics, and other suitable flexible materials.

Figure 2A:
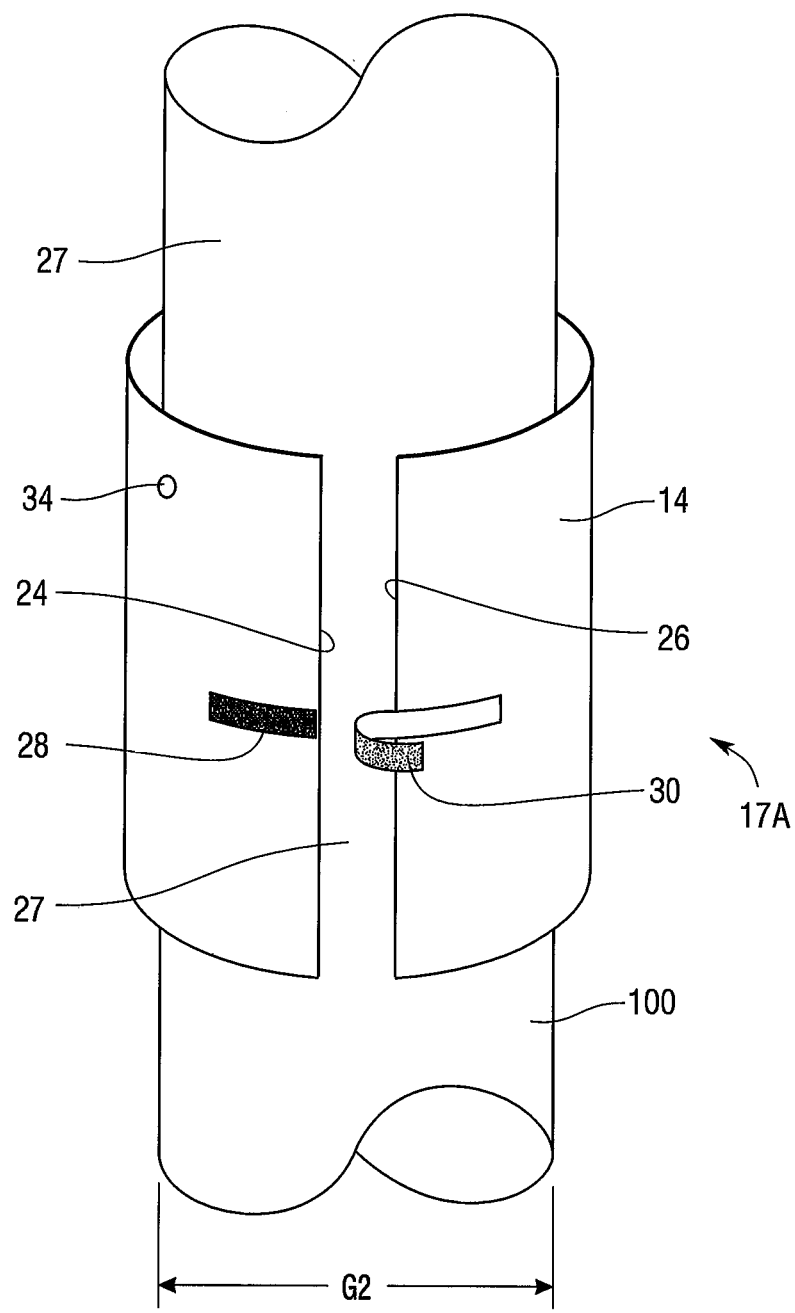
Figure 2B:
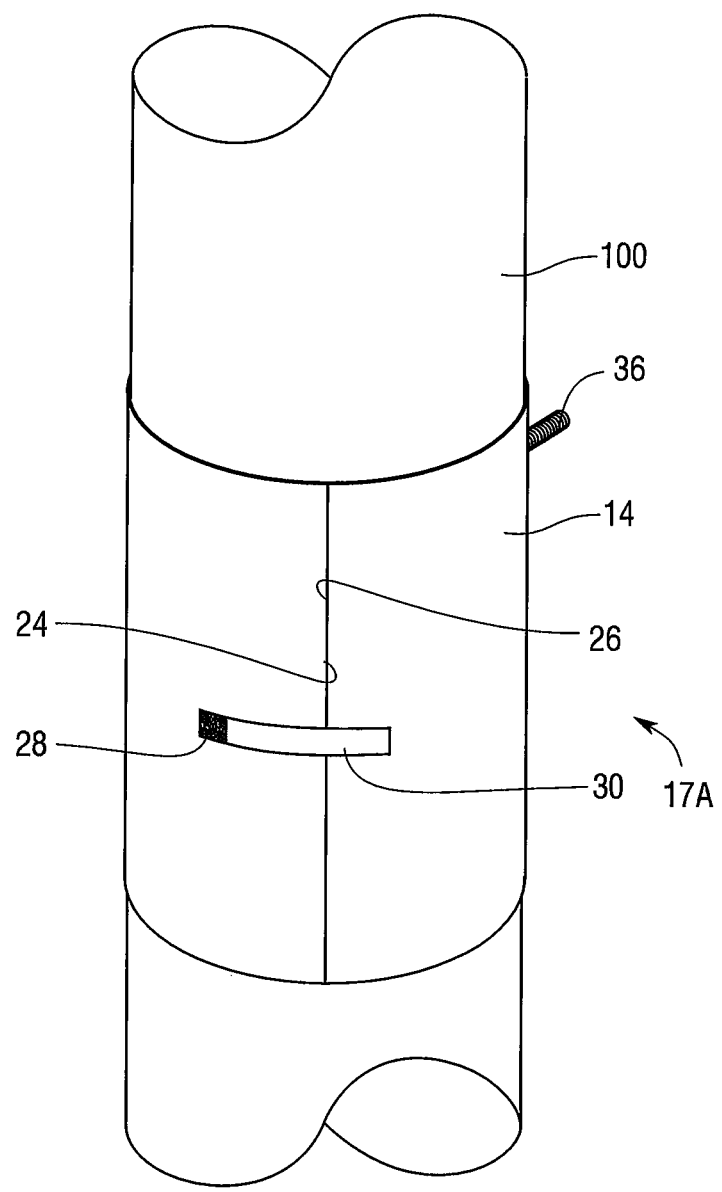

The surrounding sidewall 15 has an interior pole mount surface 16 and an opposed exterior pole mount surface 18, and opposed first and second pole mount ends 20, 22. The facing first and second gap edges 24, 26 define a gap space 27 designated G1 in the surrounding sidewall 15 when the pole mount 14 is in an unexpanded position 17 (shown in FIG. 2). As shown in FIGS. 2A and 2B, attached or joined to the exterior pole mount surface 18 is a first strip of fabric 28a having hooks 28 and the hooks 28 are exposed. Also attached to the exterior pole mount surface 18 is a second strip of fabric 30a having loop portion 30b having loops 30. In particular, the loop portion 30b has opposed first and second loop portion sides 30c, 30d, and the loops 30 extend first loop portion side 30c. The loop portion 30 is not joined to the exterior pole mount surface 18. The hooks 28 and loops 30 are capable of being releaseably attached to one another in a known manner. The first and second strips of fabric 28a, 30a are also horizontally aligned with one another such that they can be releasably joined. The first and second strips of fabric 28a, 30a are joined to the exterior pole mount surface 18 with a weatherproof adhesive or glue 23 in one of the preferred embodiments.

As mentioned, the surrounding sidewall 15 of the pole mount 14 is flexible and thus the gap space 27, as measure from the first gap edge 24 to the second gap edge 26, can be manually increased. That is, the distance from the first gap edge 24 to the second gap edge 26 can be increased manually (as indicated by arrow A in FIG. 2) such that pole mount 14 can be manually fitted around the pole 100 without breaking. The pole mount 14 is shown in the expanded position 17a in FIG. 2A as it is being fitted on the pole 100. As shown in FIG. 2A the gap space 27 is designated G2, and G2 is greater than G1 as the pole mount 14 is fitted on the pole 100.

After having been fitted on the pole 100 the pole mount 14 returns to its unexpanded position 17. As shown in FIG. 2B the hooks 28 are joined to the loops 30 of the loop portion 30b of the second strip of fabric 30a such that the pole mount 14 is compressed against the pole 100 such that the interior pole mount surface 16 abuts the pole 100. It is pointed out that the second gap edge 26 can overlap the first gap edge 24 of the pole mount 14 such that the pole mount 14 can be secured to poles 100 having different diameters. In this manner the pole mount 14 is secured to the pole 100 and is capable of supporting loads applied thereto.

As shown in FIG. 2, the pole mount 14 also defines a bolt opening 34 with three such bolt opening 34 being shown in the figure. Each of the bolt openings 34 is for receiving a bolt 36 such that a head 38 of the bolt 36 abuts against the interior pole mount surface 16. FIG. 2B shows a bolt 36 extending from the pole mount 14 for illustrative purposes. The head 38 of the bolt 36 abuts the pole 100 and abuts the interior pole mount surface 16 such that a threaded portion 39 of the bolt 38 extends in a direction that is substantially perpendicular to the pole 100. In other preferred embodiments there can be more or less than three bolt openings 34 defined in the pole mount 14.

Figure 3:
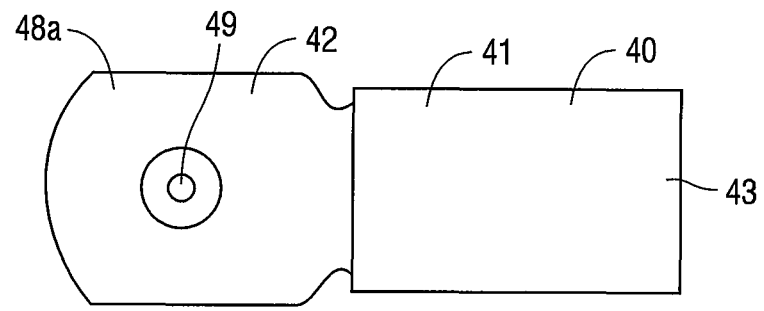
Figure 3A:
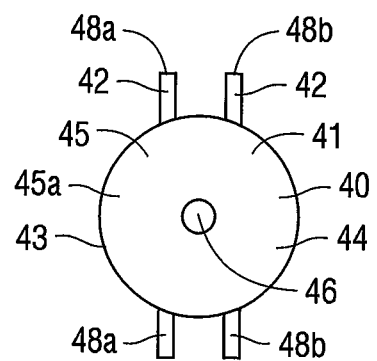
Figure 3B:
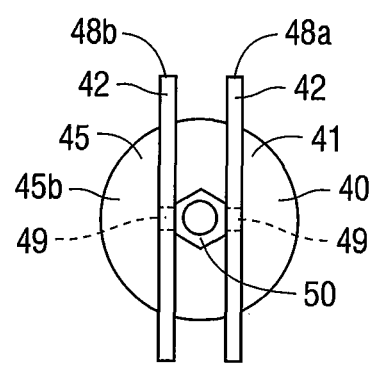
Figure 3C:
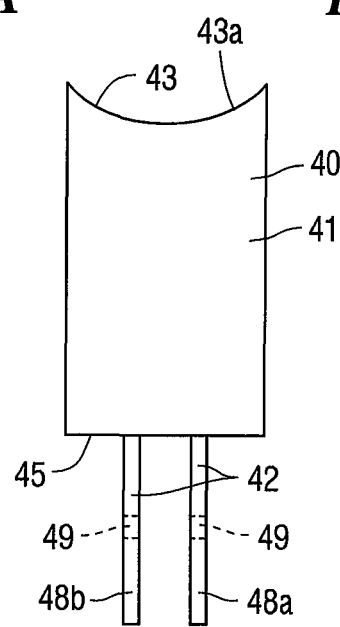

As shown in FIGS. 1 and 3-3C, the illumination device 10 also includes a light support 40, with three light supports 40 being shown. Each light support 40 is a one-piece body and has a cylindrical portion 41 that merges with an attachment portion 42 and it is made of plastic in one of the preferred embodiments. The cylindrical portion 41 has a contoured end 43 best shown in FIG. 3C that leads to a recess 44 (FIG. 3A) defined in the light support 40. The cylindrical portion 41 is joined with an end wall 45 that has an interior end wall side 45a and an opposed exterior end wall side 45b (FIG. 3B). The cylindrical portion 41 and the interior end wall side 45a define the recess 44. The end wall 45 also defines an end wall opening 46 sized to allow the bolt 36 to pass therethrough. It is pointed out that the contoured end 43 has a concave surface 43a such that when the contoured end 43 is fitted against the exterior pole mount surface 18 of the pole mount 14 the contoured end 43 abuts the exterior pole mount surface 18. In particular, the exterior pole mount surface 18 has a convex surface 18a that abuts against the concave surface 43a of the contoured end 43 of the light support 40, as shown in FIG. 1. It is pointed out that glues, caulk or epoxy can be used where light support 40 abuts the pole mount 14.

As shown in FIGS. 3B and 3C the attachment portion 42 of the light support 40 includes a pair of spaced apart support brackets 48a, 48b, that extend substantially perpendicularly from the end wall 45, and each defines a pivot pin opening commonly designated 49. Disposed between the pair of spaced apart support brackets 48a, 48b is a nut 50, and opposed flat portions of the nut 50 abut against the end wall 45 and abut against the pair of spaced apart support brackets 48a, 48b. Due to this arrangement, the nut 50 is held in place and is not capable of rotating or being rotated.

The light support 40 is attached to the pole mount 14 by installing the previously described bolt 36 through the bolt openings 34. Then the contoured end 43 of the light support is abutted against the pole mount 14 in the manner previously described. The bolt 36 is then threaded to the nut 50 and tightened thus securing the light support 40 to the pole mount 14.

The illumination device 10 also includes a lighting unit 56. In particular, as shown in FIGS. 1 and 4-6 the pair of spaced apart support brackets 48a, 48b are pivotally connected to the lighting unit 56. The lighting unit 56 has a lighting assembly 57 disposed in a light housing 60 and is powered by electrical power. As shown in FIG. 5, extending from the light housing 60 is a housing extension 61 that defines a pivot pin bore 61a. A pivot pin 58 is fitted in the pivot pin openings 49 defined in the pair of spaced apart support brackets 48a, 48b and in the pivot pin bore 61a to connect the light support 40 to the lighting unit 56. The pivot pin 58 can be replaced with a nut and bolt assembly 59 (FIG. 4) such that the user can adjust the angle of lighting unit 56 relative to the light support 40 and the pole 100 and then lock that position in place by tightening the nut and bolt assembly 59. Thus, the angle of the lighting unit 56 makes relative to the pole mount 14 (and pole 100) is infinitely variable by the user as shown by the arrow designated B in FIG. 4.

Figure 6:
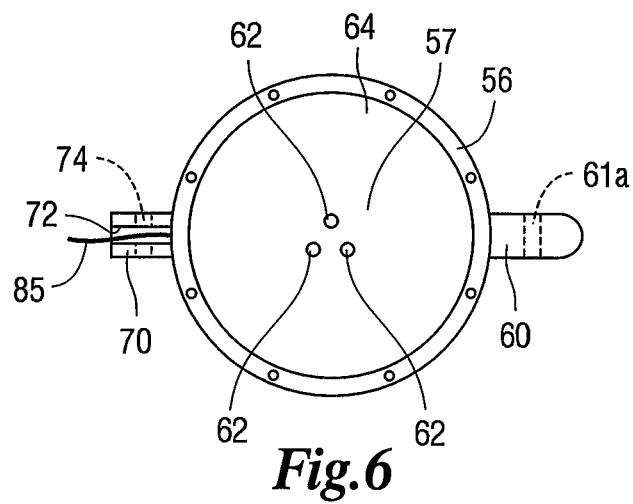

In addition, in one of the preferred embodiments the lighting assembly 57 includes a light emitting diode (hereinafter LED) 62 for producing light. The lighting assembly 57 can have three LED's 62 as shown in FIG. 6, or can have more or less than three LED's 62. The LED's 62 can emit white light or colored light. The lighting assembly 57 also includes a weatherproof transparent cover or lens 64. In other embodiments the lens 64 may be colored. LED's and the use and operation of such LED's are well known to those having ordinary skill in the art and they are therefore not described in greater detail herein. In addition, other suitable lights may be used for providing light in other preferred embodiments.

Figure 4:
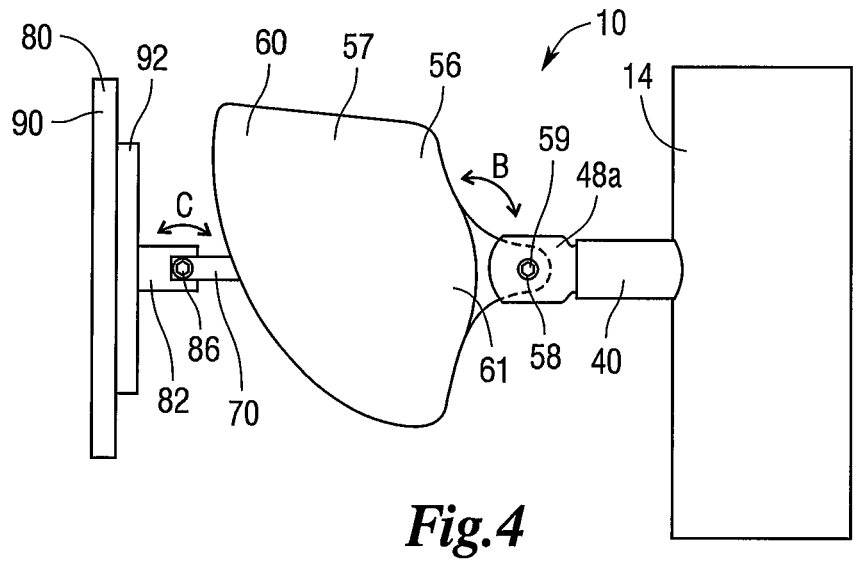
Figure 5:
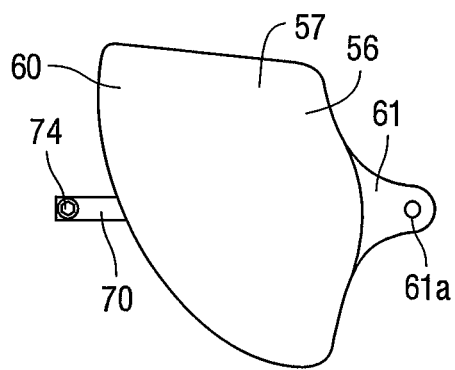

As also shown in FIGS. 4 and 6, the light housing 60 also has a extending from it a solar panel support arm 70, and the solar panel support arm 70 is diametrically opposed to the housing extension 61. The solar panel support arm 70 defines a support arm recess 72 and defines support arm bores 74.

Figure 7:
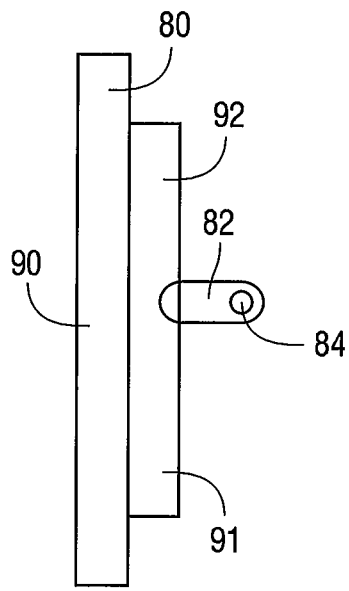
Figure 8:
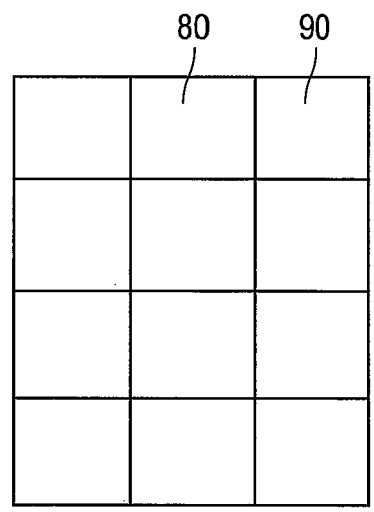

As shown in FIGS. 4, 7 and 8 the illumination device 10 also includes a solar panel assembly 80 having a panel mount member 82. The panel mount member 82 defines a panel mount member bore 84. A solar panel pivot pin 86 is provided and is fitted in the support arm bores 74 and the panel mount member bore 84, thus attaching them together. The solar panel pivot pin 86 can embodied in the form of a nut and bolt assembly 59 (FIG. 4) such that the user can adjust the angle of panel mount member 82 relative to the solar panel support arm 70 and then lock that position in place by tightening the nut and bolt assembly 59. Thus, the angle the solar panel assembly 80 makes relative to the solar panel support arm 70 is infinitely variable by the user as shown by the arrow designated C in FIG. 4. In addition, the solar panel assembly 80 also includes a solar panel 90 and a rechargeable battery 92 for storing electrical power collected by the solar panel 90. The rechargeable battery 92 is disposed in a battery housing 91 and the solar panel 90 is mounted on and joined to the battery housing 91. Wires 85 (FIG. 6) extend from the solar panel assembly 80 to the lighting unit 56 to power the LED's 62. The use, operation and construction of solar panels, batteries for storing the electrical power collected by the solar panels, and the associated wiring and circuitry to power LED's is well known to those having ordinary skill in the art and is therefore not described in greater detail herein.

In use, the user installs the illumination device 10 on the pole 100 in the manner previously described and optionally at a height that is out of the reach of people who happen to pass by the pole 100. The user rotates the solar panels 90 to ensure maximum exposure to the sun. In one of the preferred embodiments the pole 100 is embodied as a flagpole 101. In such an embodiment the user also rotates the lighting units 56 to ensure the rays of light 200 (FIG. 9) make full contact with a flag 102 hanging from the flagpole 101. The solar panel assembly 80 will thereafter collect and store energy during the day and emit light at night on the flag 102, thus illuminating the flag 102.

In another preferred embodiment of the illumination device 10 the pole mount 14 is connected to four light supports 40 and the light supports 40 are spaced an equal distance from one another about the pole mount 14.

In another preferred embodiment of the illumination device 10 the pole mount 14 is connected to two light supports 40 that are spaced an equal distance from one another. That is, the light supports 40 extend in diametrically opposite directions from the pole mount 14.

In another preferred embodiment of the illumination device 10 there are three light supports 40 that are spaced equal distances from one another.

In another preferred embodiment the pole mount 10 and the light supports 40 can be formed of molded plastic such that the pole mount 10 and light supports 40 are in the form of as one-piece body. In this embodiment the need for the above-described bolt 36 and nut 50 is eliminated.

In another preferred embodiment the illumination device 10 is sold as a kit that may include a pole 100 or flagpole 101. The pole mount 14 may be made without the first and second gap edges 24, 26, that is, without the gap space 27, because the diameter of the pole 10 is known in advance. The first strip of fabric 28a having hooks 28 and the second strip of fabric 30a having loop portion 30b having loops 30 is provided for on the pole mount 14 as previously described, and they are used to compress the pole mount 14 on the flagpole 101.

Figure 9:
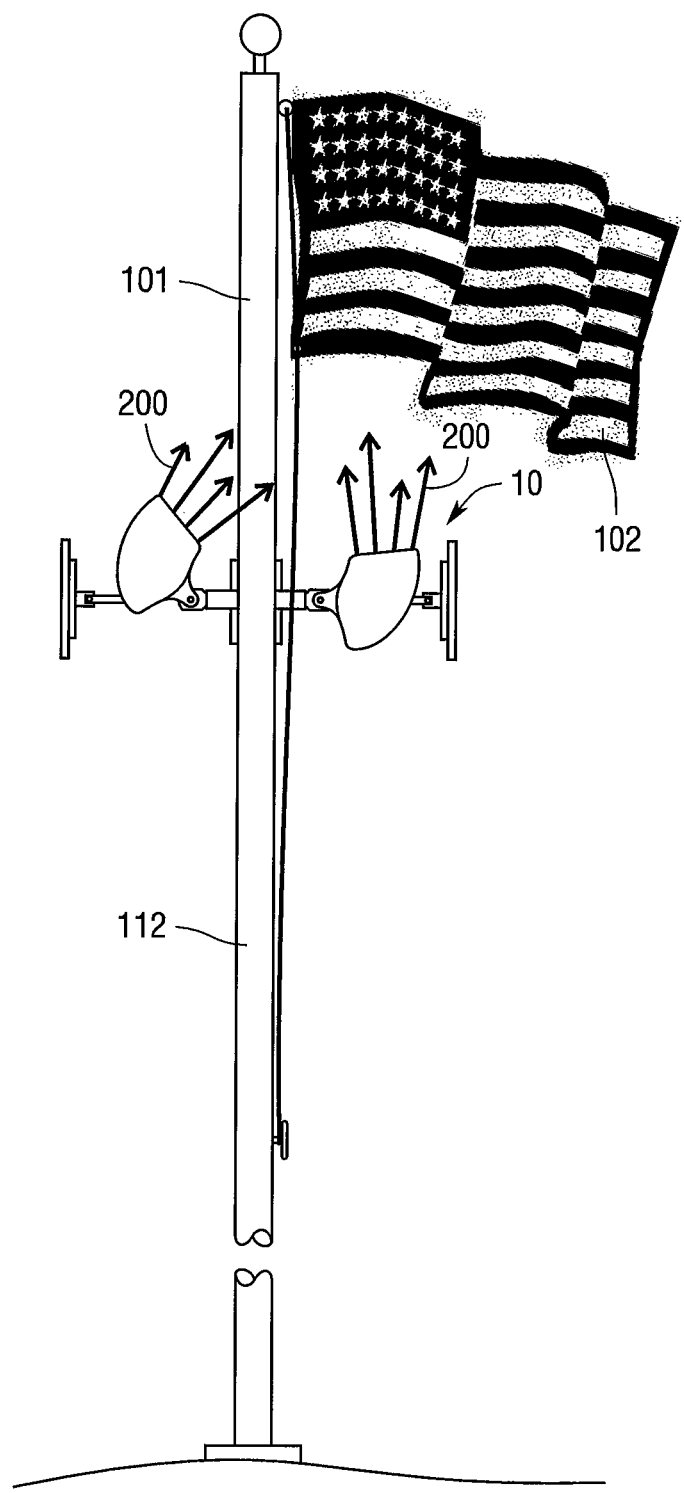

FIG. 9 is a view of the illumination device 10 installed on a flagpole 101 at nighttime with rays of light 200 illuminating the flag 102.

Figure 10:
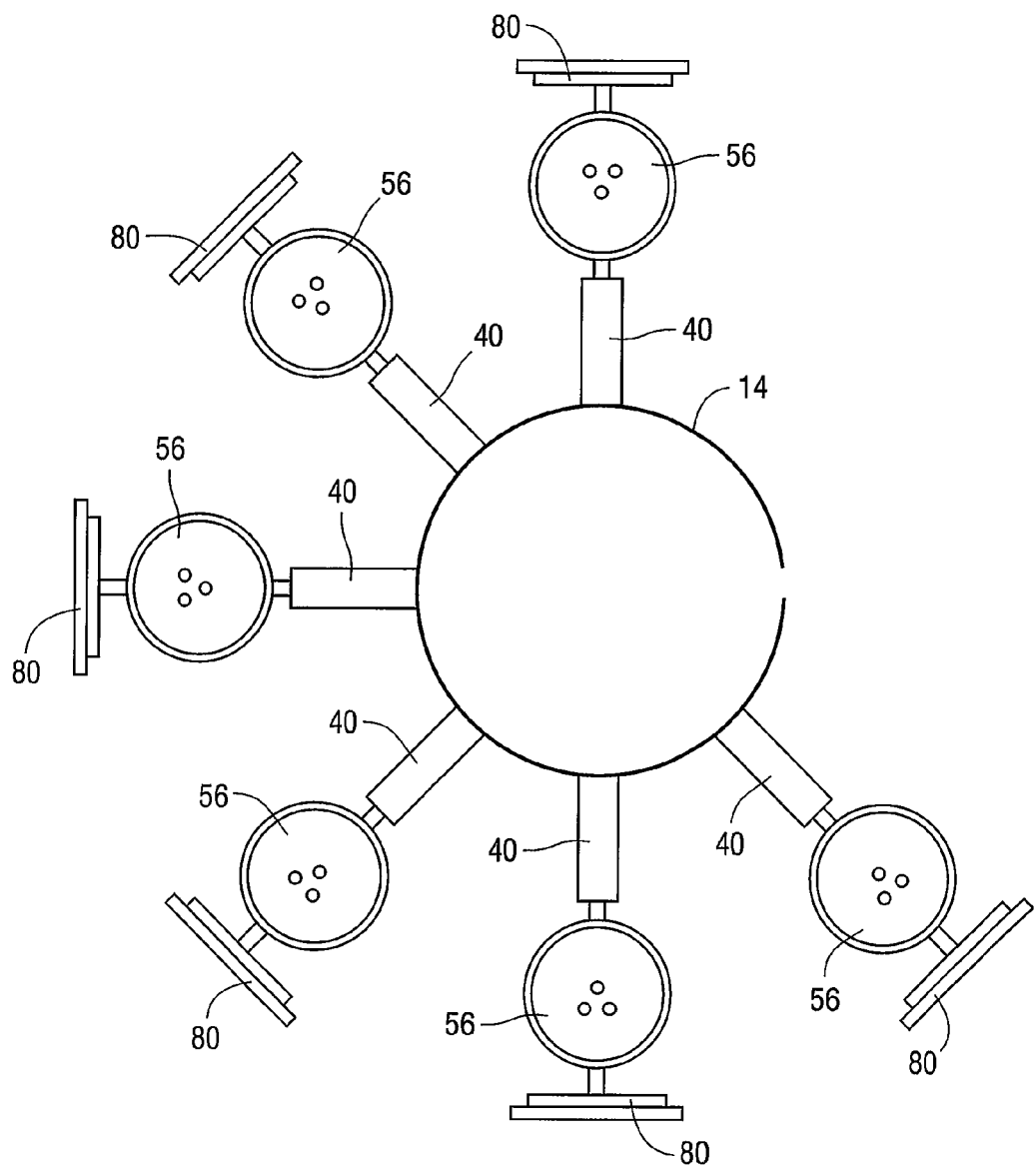

FIG. 10 is another preferred embodiment wherein the illumination device 10 has a plurality of spaced apart lighting units 56. In other preferred embodiments the lighting units 56 can be equidistant from one another and the number of light units 56 can be varied, for example from one to eight lighting units 56.

Figure 11:
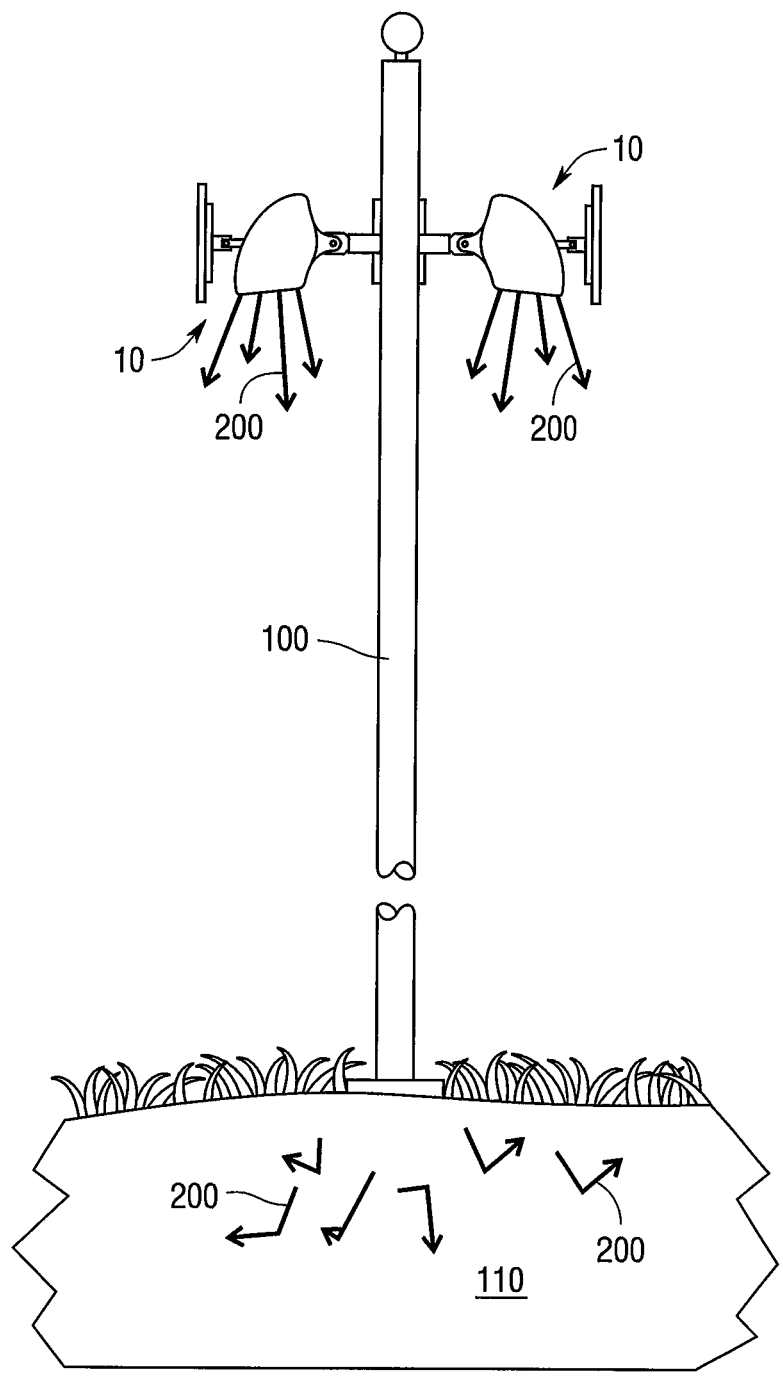
FIG. 11 is an embodiment wherein the illumination device is installed on a pole in an inverted position to provide ground lighting.

FIG. 11 is another embodiment wherein the illumination device 10 is mounted in an inverted position on a pole 100 so that a path or road 110 is illuminated by the lighting units 56.

Figure 12:
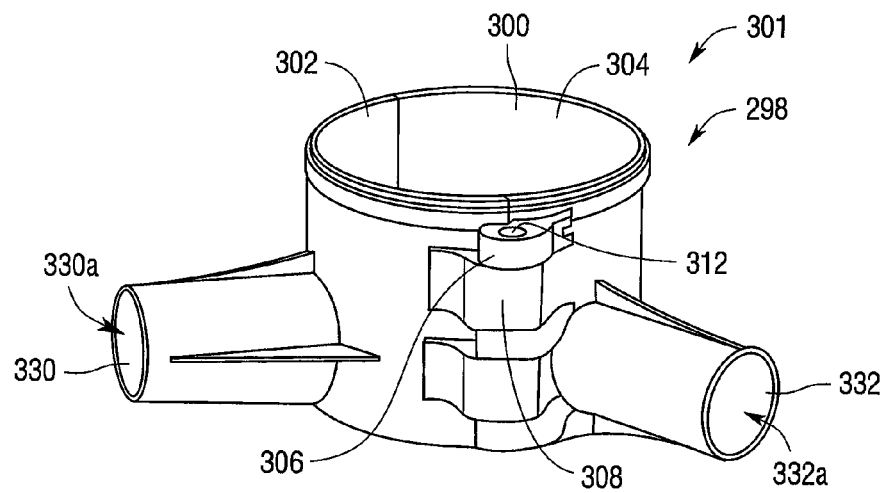
FIG. 12 is a perspective view of a pole mount clamp in a closed position.

FIGS. 12-19 depict another preferred embodiment showing an illumination apparatus 298 that includes a pole mount clamp 300 (best shown in FIG. 19) and a light emitting assembly 360. As shown in FIG. 12, the pole mount clamp 300 is in a closed clamp position 301. In the closed position 301 the pole mount clamp 300 has an internal diameter (designated ID in FIG. 15) of about 4 (four) inches. The pole mount clamp 300 has a first clamp half 302 and a second clamp half 304. In one of the preferred embodiments the pole mount clamp 300 is made of plastic.

Figure 13:
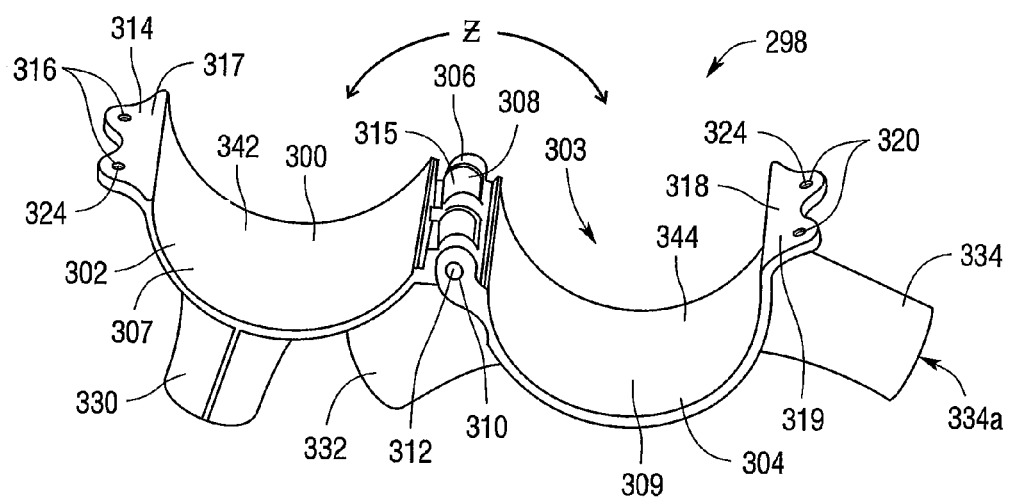
FIG. 13 is a top perspective view of the pole mount clamp in an open position.

As best shown in FIG. 13, the first clamp half 302 has a first barrel members 306 and as shown there are two such first barrel members 306, and the second clamp half 302 has second barrel members 308, and there are three such second barrel members 308. The first barrel members 306 and the second barrel members 308 are intermeshed with one another and together define a pin opening 310. A hinge pin 312 is disposed in the pin opening 310 to hold the first and second barrel members 306, 308 together to form a hinge 315, so that the first and second clamp halves 302, 304 can be rotated relative to one another as indicated by the arrow designated Z in FIG. 13. In FIGS. 13 and 14 the pole mount clamp 300 is in an open clamp position 303. The first and second clamp halves 302, 304 and the hinge pin 312 are made of plastic on one of the preferred embodiments, but can be made of other materials, for example metals. It is pointed out that, as shown in FIG. 13, in one of the preferred embodiments the first clamp half 302 and the first barrel members 306 are formed as a one piece body 307, and the second clamp half 304 and the second barrel members are formed as a one piece body 309.

As shown in FIG. 13 the first clamp half 302 has a first clamping lug 314 with first lug openings 316, and the second clamp half 304 has a second clamping lug 318 with second lug openings 320. When the first and second clamp halves 302, 304 are in the closed clamp position 301 the first and second lug openings 316, 320 are aligned with one another and fasteners 322 (FIG. 15) are inserted therein to hold the first and second clamp halves 302, 304 in the closed clamp position 301. When the pole mount clamp 300 is in the closed clamped position 301 the pole mount clamp 300 defines a pole opening 305. The fasteners 322 can be repeatedly tightened and removed such that the first and second halves 302, 304 can be repeatedly moved from the closed clamp position 301 to the open clamp position 303. The fasteners 322 may comprise plastic or metal and are threaded in one of the preferred embodiments so as to be able to thread to internal threads, commonly designated 324, that surrounds one or both of the to an first and second lug openings 316, 320. It is pointed out that in one of the preferred embodiments the first clamp half 302 and the first clamping lug 314 are formed as a one-piece body 317, and the second clamp half 304 and the second clamping lug 318 are formed as a one-piece body 319.

Figure 16:
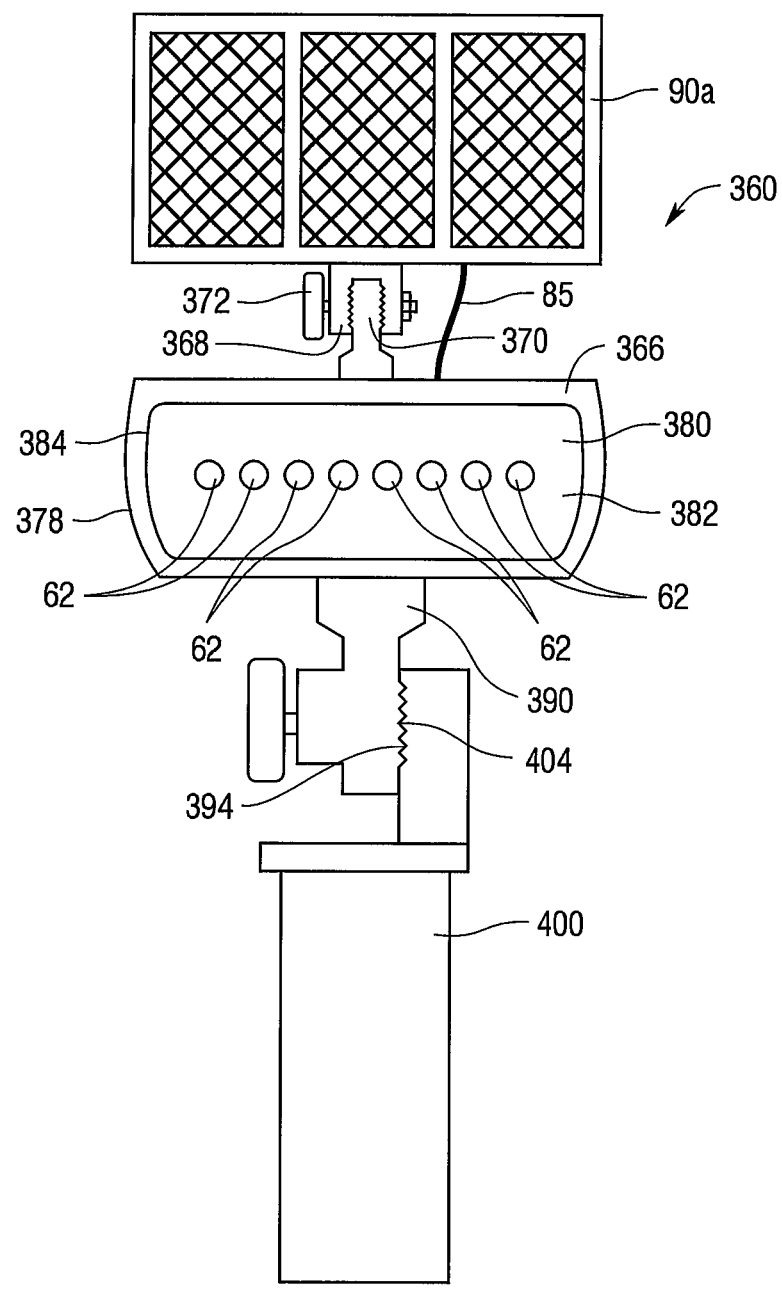
FIG. 16 is a front view of a light emitting assembly that is capable of being supported by the pole mount clamp.

As shown in FIG. 13, extending from the first clamp half 302 is a first light support 330, and extending from the second clamp half 304 are second and third light supports 332, 334. As best shown in FIGS. 14, 15 and 19 each of the first, second and third light supports 330, 332, 334 defines first, second and third clamp fastener openings designated 337a, 337b, and 337d, respectively, and each sized to receive a clamp fastener 339 that may be embodied as a screw. In one of the preferred embodiments the first clamp half 302 and the first light support 330 are formed as a one-piece body 331 and can be made of plastic, and similarly, the second clamp half 304 and the second and third light supports 332, 334 are formed as a one piece body 335 and can be made of plastic. The first, second and third light supports 330, 332, 334 define first, second and third light support recess 330a, 332a, 334a, respectively, each for receiving an arm insert 400 (shown in FIGS. 16, 17, 18 and 19). FIG. 16 shows an arm insert opening 403 defined in the arm insert 400 that can be aligned with the first clamp fastener opening 337a. The clamp fastener 339 is then moved through the first clamp fastener opening 337a and arm insert opening 403 and tightened to secure them together.

As shown in FIG. 13, the first clamp half 302 has a first clamp half internal surface 342, and the second clamp half 304 has a second clamp half internal surface 344, and each of the first and second clamp half internal surfaces 342, 344 is concave. As shown in FIGS. 15 and 15A, an insert 338 is provided that is made of plastic or from a rigid plastic or a rigid foam material and has a circular shape and resembles the shape of an O-ring. The insert 338 is disposed such that it abuts against the pole 100 and the first and second clamp half internal surfaces 342, 344 when the first and second clamp halves 302, 304 are in the closed clamp position 301. The insert 338 could be installed by moving it over an end of the pole 100 until it is at the desired location on the pole. The purpose of the insert 338 is to allow the pole mount clamp 300 to be adapted for use with poles 100, for example flagpoles 101, having different diameters. As shown in FIG. 15B the insert 338 is embodied as a split ring insert 338a having a slit 338b, such that the split ring insert 338a and can be readily fitted around the pole 100 at any desired location on the pole 100. The split ring insert 338A is disposed such that it abuts against the pole 100 and the first and second clamp half internal surfaces 342, 344 when the first and second clamp halves 302, 304 are in the closed clamp position 301. In one of the preferred embodiments an adhesive 346 (preferably a weatherproof adhesive and shown in FIG. 15) is applied to the one of the first or second internal surfaces 342, 344. The insert 338 (or the split ring insert 338a) is then moved into contact with the adhesive 346 and adhered to the pole mount clamp 300. The adhesive 346 could be applied such that is covers both the first and second internal surfaces 342, 344 so that the insert 338 is adhered to both the first and second clamp halves 302, 304, but it would need to be cut if the first and second halves 302, 304 needed to be unclamped.

The insert 338 thus allows the pole mount clamp 300 to be used with in connection with poles 100 having diameters of less than four inches, for example three inches, two and a half inches and two inches. Indeed, the insert 338 can be formed in various sizes such that the pole mount clamp 300 can accommodate virtually any pole 100 having a diameter of less than four inches. In other preferred embodiments the pole mount clamp 300 has an internal diameter greater than four inches.

Figure 17:
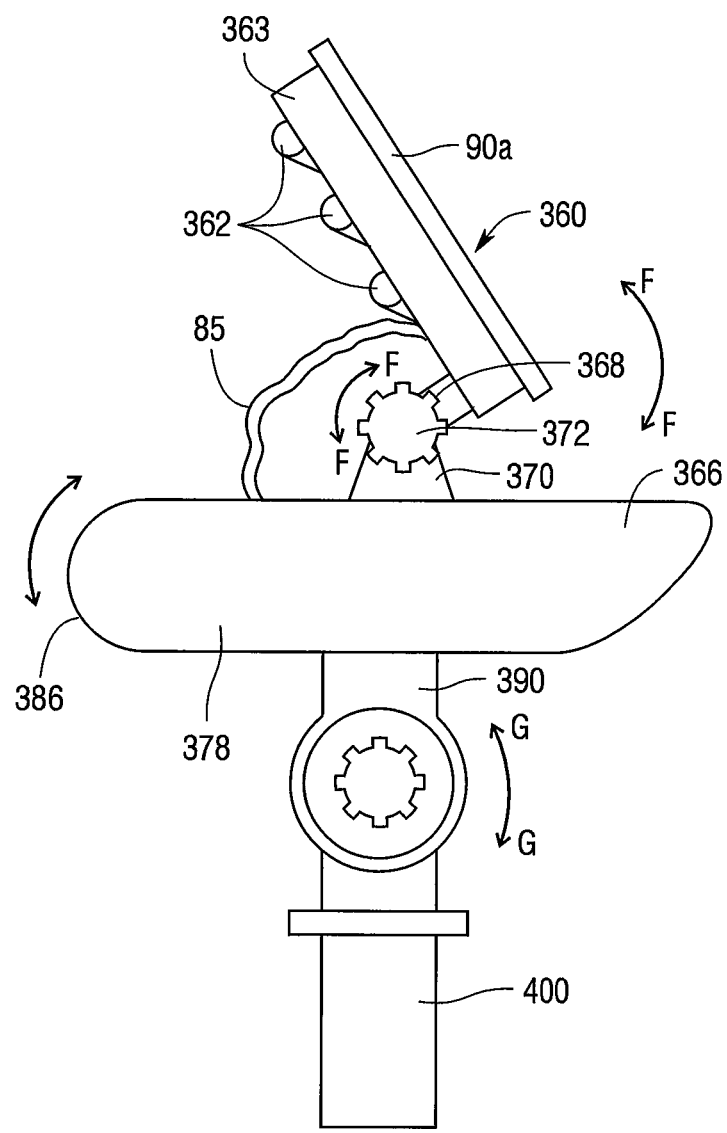
FIG. 17 is a side view of the light emitting assembly.

As shown in FIGS. 16 and 17, there is the light emitting assembly 360 of the illumination apparatus 298. The light emitting assembly 360 is capable of being supported by the above-described pole mount clamp 300. The light emitting assembly 360 includes a solar panel 90a and a rechargeable battery pack 362 (FIG. 17). In one of the preferred embodiments the rechargeable battery pack 362 includes three 1,500 milliamp-hour batteries with an output voltage of about 5 (five volts). The battery pack 362 is disposed in a battery pack housing 363.

The light emitting assembly 360 also includes a light emitting diode component 366. A wire 85 connects the rechargeable battery pack 362 to the light emitting diode component 366, and the light emitting diode component 366 has eight (8) LED's 62. The number of LED's 62 may be varied.

As shown in FIGS. 16 and 17 a pair of panel lugs 368 extends from the battery pack housing 363. A light emitting diode lug 370 extends from the light emitting diode component 366, and the light emitting diode lug 379 is positioned between the pair of panel lugs 368. An adjustment bolt 372 extends through both the pair of panel lugs 368 and the light emitting diode lug 370, thus holding them together. The adjustment bolt 372 can be loosened and then tightened such that the solar panel 90a can be adjusted relative to the light emitting diode component 366 (as indicated by the arrow designed F-F in FIG. 17) and then fixed in any desired position by tightening the adjustment bolt 372.

The light emitting diode component 366 has an outer housing 378, and disposed internal to the outer housing 378 is a LED housing 380 that includes a lens 382, as shown in FIG. 16. The LED housing 380 is designed so as to be watertight. There is a gap space 384 defined between the LED housing 380 and the outer housing 378 such that water can drain around the LED housing 380 and out an outflow opening 386 (FIG. 17) defined in the outer housing 378.

Figure 18:
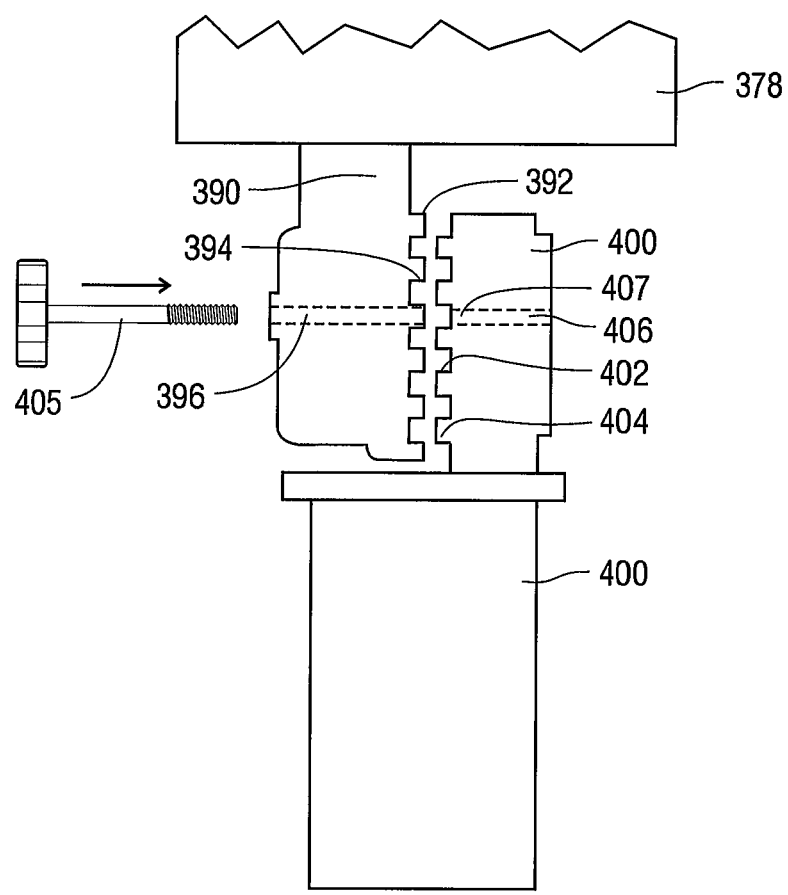
FIG. 18 is a side view of a toothed clamp.
Figure 19:
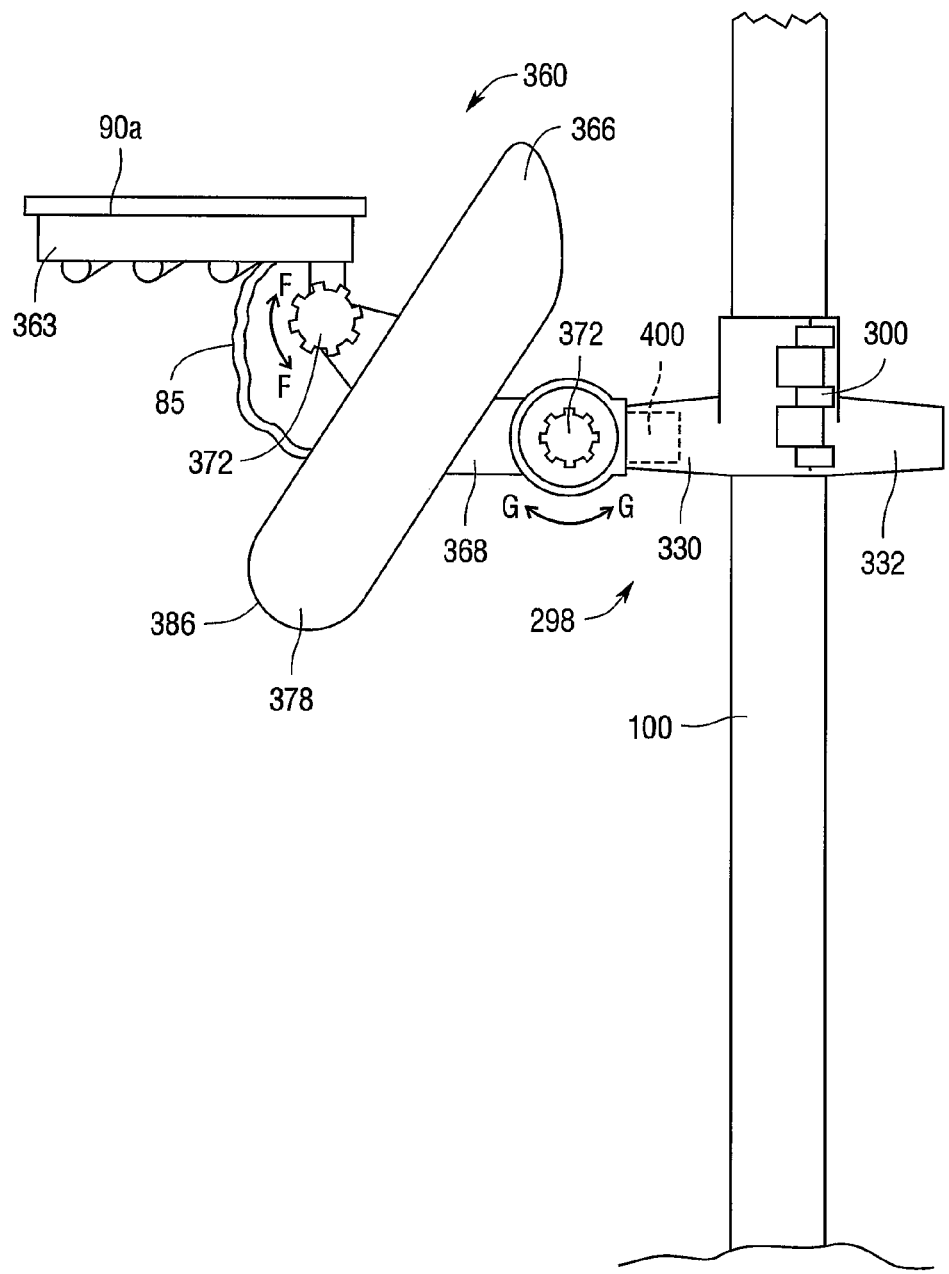
FIG. 19 is a side view of the light emitting assembly supported by a pole mount clamp that is clamped to a pole.

As shown in FIG. 18 extending from the outer housing 378 of the light emitting diode component 366 is a housing arm 390. The housing arm 390 has a first toothed portion 392 having first teeth 394 that extend therefrom, and the first toothed portion 392 defines a bolt opening 396. The light emitting assembly 360 also includes the previously mentioned arm insert 400 that has a second toothed portion 402 having second teeth 404 that extend therefrom, and the second toothed portion 402 defines a bolt opening 406. The arm insert 400 also has an insertion portion 401 that meets with the second toothed portion 402. The first and second teeth 394 are 404 are sized such they are capable of meshing together when the first and second toothed portions 392, 402 are moved together and abut one another. A bolt 405 is threadable to a nut 407 disposed in the arm insert 400 and is for connecting the housing arm 390 and the arm insert 400 together. It is pointed out that prior to tightening the nut and bolt 407, 405 and prior to meshing the first and second teeth 394, 404 the housing arm 390 and the arm insert 400 are rotated or moved relative to one another (as indicated by the arrow G-G in FIG. 17) so the user can select a desired angle for the light emitting diode component 366. Once the angle is selected, the user meshes the first and second teeth 394, 404 and tightens the nut and bolt 407, 405 thus locking the position of the light emitting diode component 366 in place.

As shown in FIG. 19, the above described insertion portion 401 of the arm insert 400 is inserted into the first light support recess 330a defined in the first light support 330 and is held therein with, for example, a pressure or compression type fit. In addition, the user can use the previously described clamp fasteners 339 to connect the arm insert 400 and the first light support 330 for additional stability, for example in high wind situations. The arm insert 400 could also be connected to the first light support 330 with, for example, adhesives. In addition, the insertion portion 401 of the arm insert 400 is shown having a generally cylindrical shape.

In another preferred embodiment shown in FIGS. 16A and 16B the insertion portion 401 of the arm insert 400 is modified. In particular, the insertion portion 401 is replaced with a shaped insertion portion 420 having four ribs commonly designated 422 that are perpendicular to one another that meet and join with circular walls 424 that are circular shaped. The ribs 422 and circular walls 424 provide for a compressive/friction fit when the shaped insertion portion 420 is moved into, for example, the first light recess 330a of the first light support 330.

FIG. 19 is a side view of one of the illumination apparatus 298 wherein one of the light emitting assemblies 360 is supported by the first light support 330 of the pole mount clamp 300. It is to be understood that the second and third light supports 332, 334 can also support light emitting assemblies 360 in the manner described above. Due to the fact that the solar panel 90a can be moved as indicated by the arrow designate F-F, and the light emitting diode component 366 can be moved as indicated by arrow designated G-G the illumination apparatus 298 can be readily adjusted to accommodate virtually any lighting application and gather solar energy regardless of the season of the year.

Figure 20:
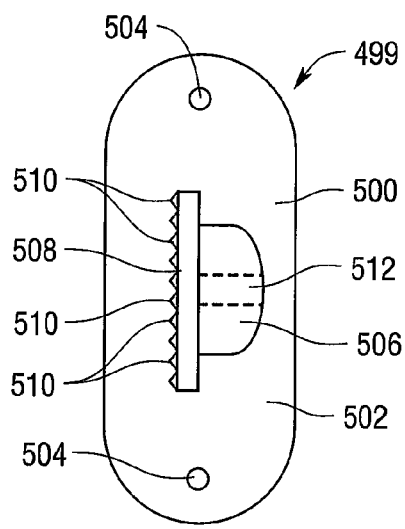
FIG. 20 is a top view of an embodiment showing an arm mount.
Figure 21:
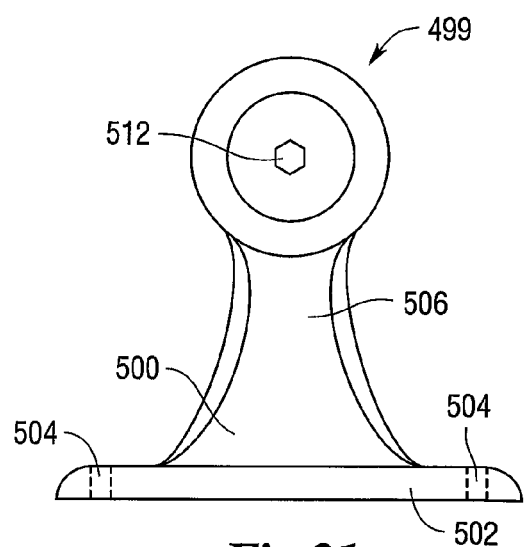
FIG. 21 is a front view of the arm mount of FIG. 20.
Figure 21A:
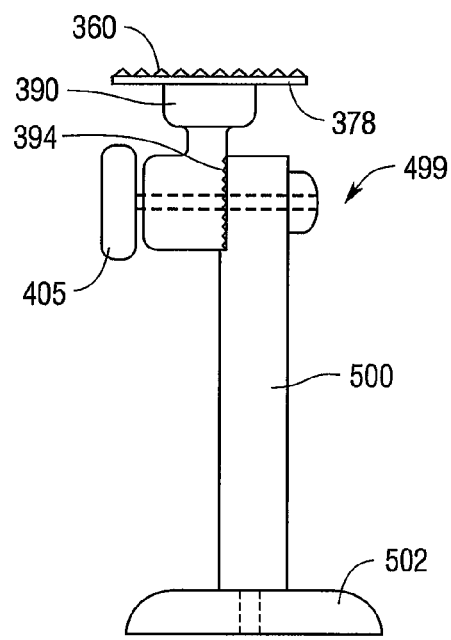
FIG. 21A is a side view of the arm mount and a portion of the light emitting assembly.

In another preferred embodiment shown in FIGS. 20-21A there is a supported illumination device 499 wherein the above-described arm insert 400 (FIG. 18) is replaced with an arm mount 500 that is capable of being bolted, nailed or screwed directly to a surface, for example a wall, a floor 507, a post or a tree (not shown). Here, the pole mount claim 300 is not needed. The arm mount 500 has a base portion 502 that defines arm mount openings 504 for accommodating the screw, nail or bolt. Extending from the base portion 502 is an arm portion 506 that meets with an arm toothed portion 508 having arm teeth 510 that extend therefrom, and the arm toothed portion 508 has an arm bolt opening 512. The arm teeth 510 of the armed toothed portion 508 intermesh with the first teeth 394 of the first toothed portion 392 (shown in FIG. 18) in the manner described immediately above. Thus, the arm mount 500 expands the scope of use of the invention to flat surfaces.

Figure 22:
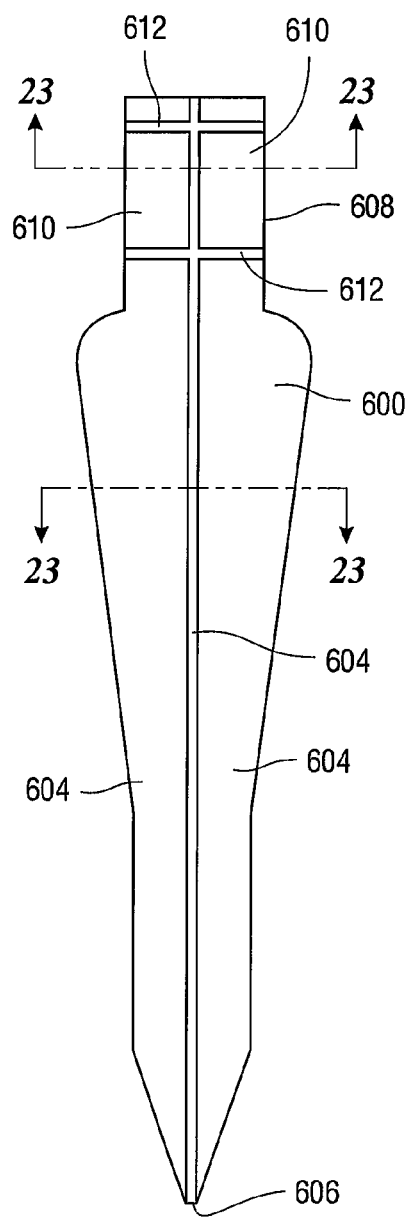
FIG. 22 is a front view of a ground spike.
Figure 23:
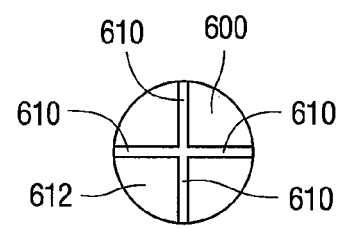
FIG. 23 is a sectional view of the ground spike taken along line Z-Z of FIG. 22.
Figure 24:
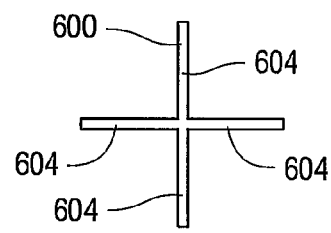
FIG. 24 is a sectional view of the ground spike taken along line Y-Y of FIG. 23.

In another preferred embodiment there is a spike supported illumination device 599 shown in FIGS. 22-24 there is a ground spike 600 having a spike portion 602. The spike portion 602 has four spike flanges commonly designated 604 that are each tapered to and terminate at a spike tip 606. In addition, extending from the ground spike 602 is a spike insertion portion 608 having four spike ribs commonly designated 610 that are perpendicular to one another that meet and join with circular spike walls 612. The spike portion 602 is capable of being driven into the ground.

Figure 25:
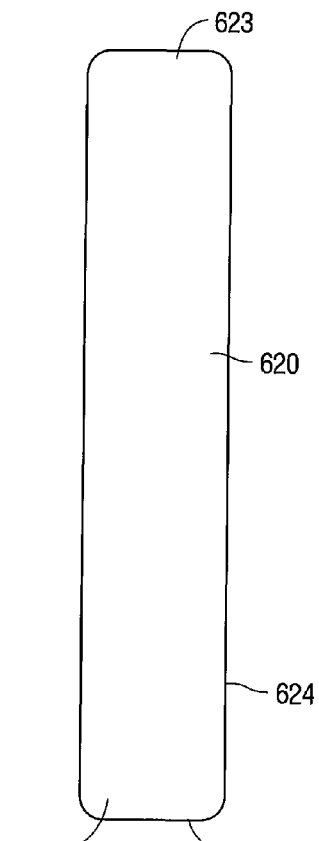
FIG. 25 is top view of an extension member.
Figure 26:
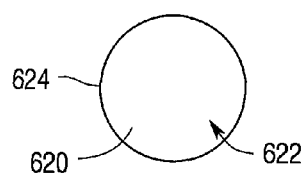
FIG. 26 is an end view of the extension member.
Figure 26A:
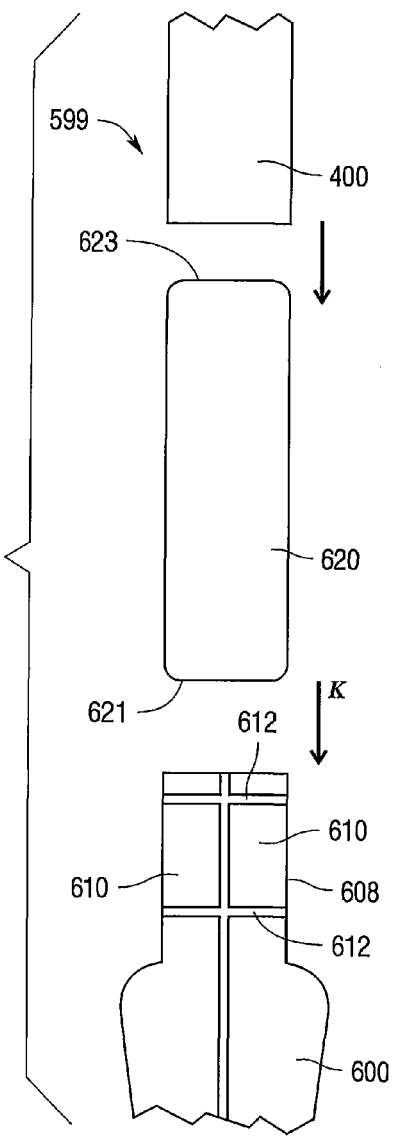
FIG. 26A is a view of the ground spike as a connecting member is moved on the ground spike in the direction of arrow K and an arm insert capable of being received in the connecting member.

As shown in FIGS. 25 and 26 there is an extension member 620, and the extension member 620 is hollow and defines and extension member opening 622 and has an exterior surface 624. The exterior surface 624 may have longitudinal corrugations 626 in one of the preferred embodiments. As shown in FIG. 26A, the extension member 620 has an internal diameter and the spike insertion portion 608 is capable of fitting in a first extension member end 621 in a close fitting friction fit or compression type fit. In addition, the extension member 620 also has an opposed second extension member end 623 that is capable of receiving the above-described insertion portion 401 (FIG. 18) of the arm insert 400 therein in a close fitting relationship friction fit or compression type fit. Thus, the extension member 620 elevates the light emitting assembly 360 above the surrounding ground 99.

Figure 27:
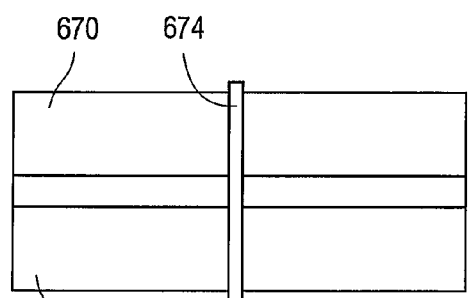
FIG. 27 is a top view of a connector member.
Figure 28:
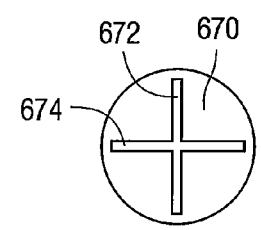
FIG. 28 is an end view of the connector member.
Figure 29:
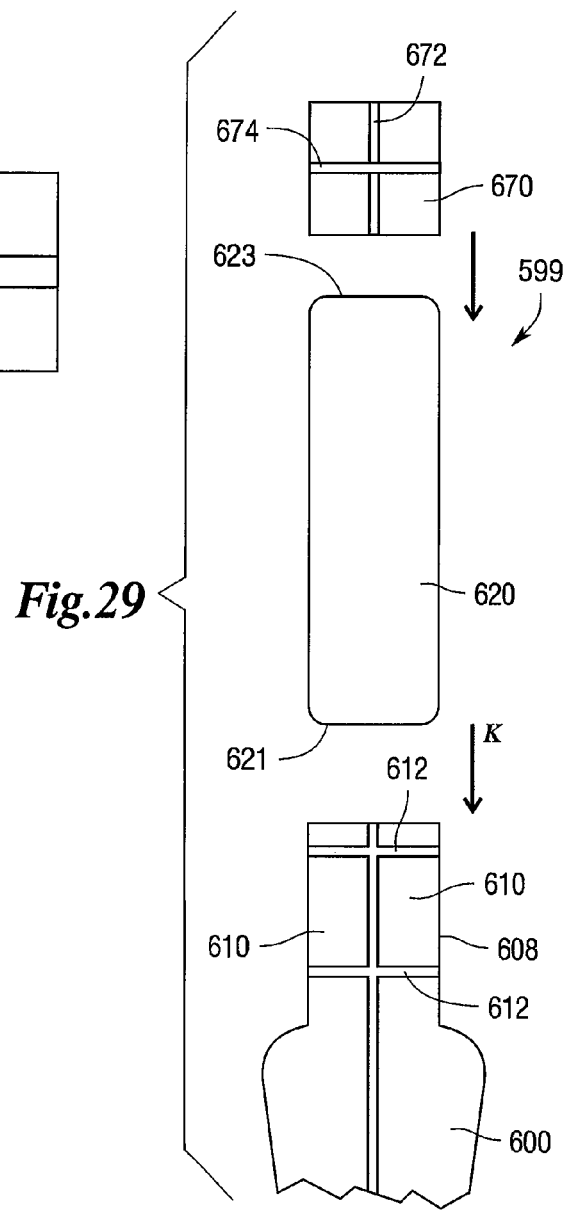
FIG. 29 is a diagrammatic view of the connector member, extension member and the ground spike.

To elevate the light emitting assembly 360 even higher a connector member 670 is provided and is shown in FIGS. 27-29. The connector member 670 has first and second connector ribs 672, 674 that meet at right angles relative to one another, and a spacing disk 674 is disposed in the first and second connector ribs 672, 674 such that they extend in opposite directions from the spacing disk 674. The spacing disk 674 also extends beyond the edges of the first and second connector ribs 672, 674. The connector member 670 is capable of making a close fitting friction/compression type fit with the extension members 620, and the spacing disk 674 prevents the connector member 670 from entering the interior of the extension member 620. As is readily apparent, any desired number of the extension members 620 can be connected in this manner by adding more connector members 670 and extension members 620 as shown in FIG. 29, to thus provide for virtually any spacing of the light emitting assembly 360 from the ground spike 602.

Figure 30:
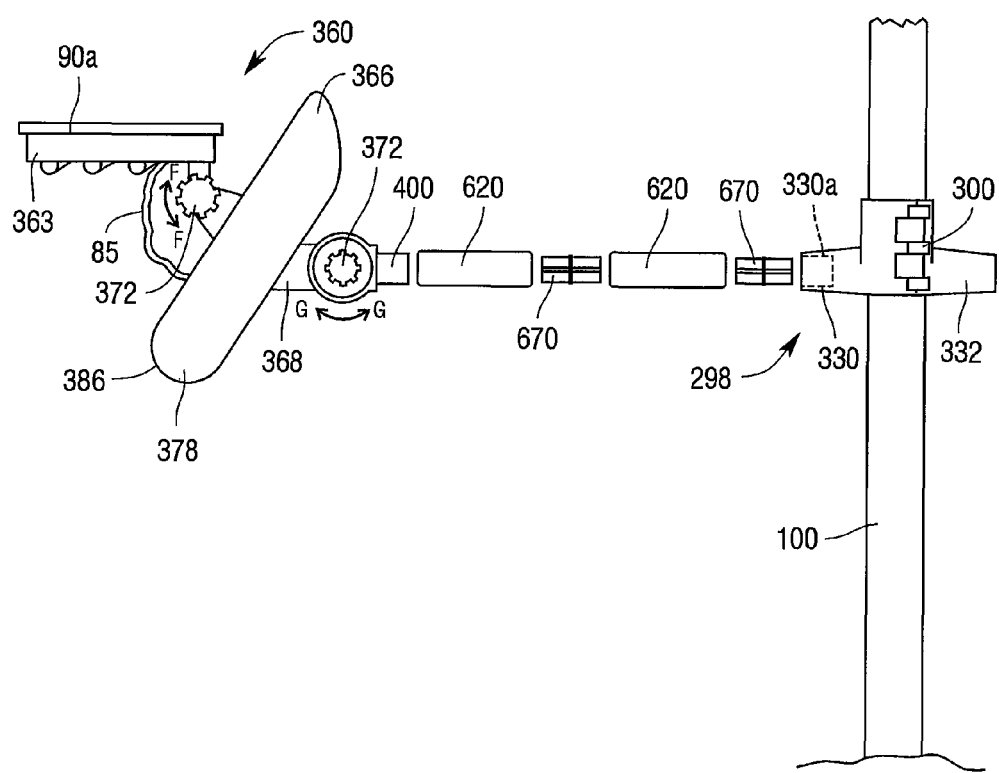
FIG. 30 is a diagrammatic view of connector members, extension members, the pole mount and the lighting assembly where the connector and extension members increase the distance of the lighting assembly from the pole mount.

The use of the above-described extension member 620 and connector member 670 is not limited solely to use in connection with the ground spike 602. In particular, as shown in FIG. 19 the light emitting assembly 360 is supported directly by the first light support 330 of the pole mount clamp 300. The distance from the light emitting assembly 360 to the pole mount clamp 330 can be increased by the use of the extension members 620 and connector members 670. For example, in FIG. 30 there are a plurality of connector members 670 and extension members 620 (prior to being inserted into one another). Thus, the distance of the light emitting assembly 360 from the pole 100 can be increased by the use of connector members 670 and extension members 620, and this fills the needs of users having different lighting requirements.

In addition, the illumination apparatus 298, the supported illumination device 499, and the spike supported illumination device 599 can be sold as kits.

Figure 31:
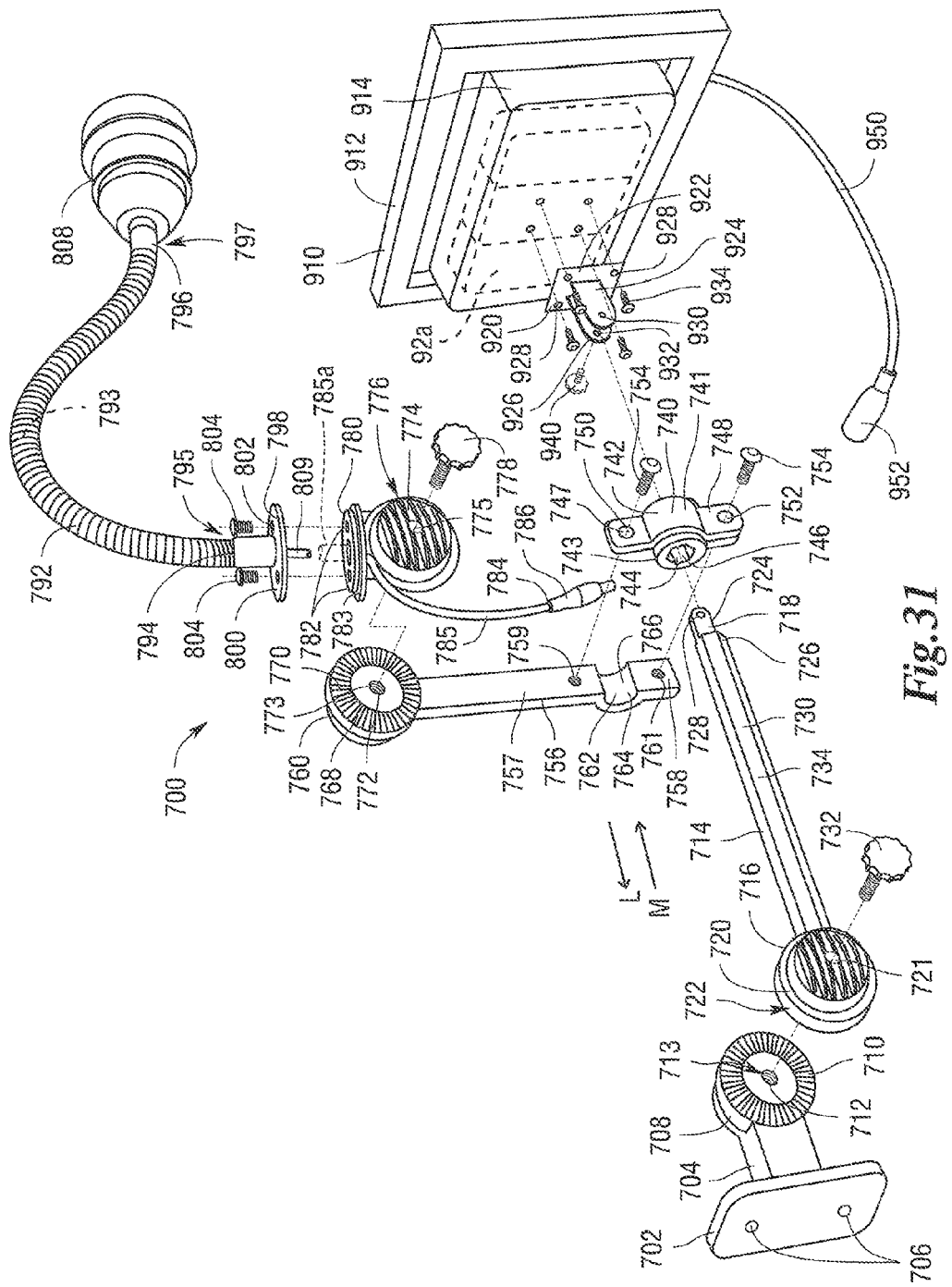
FIG. 31 is an exploded view of a flexible lighting assembly.
Figure 32:
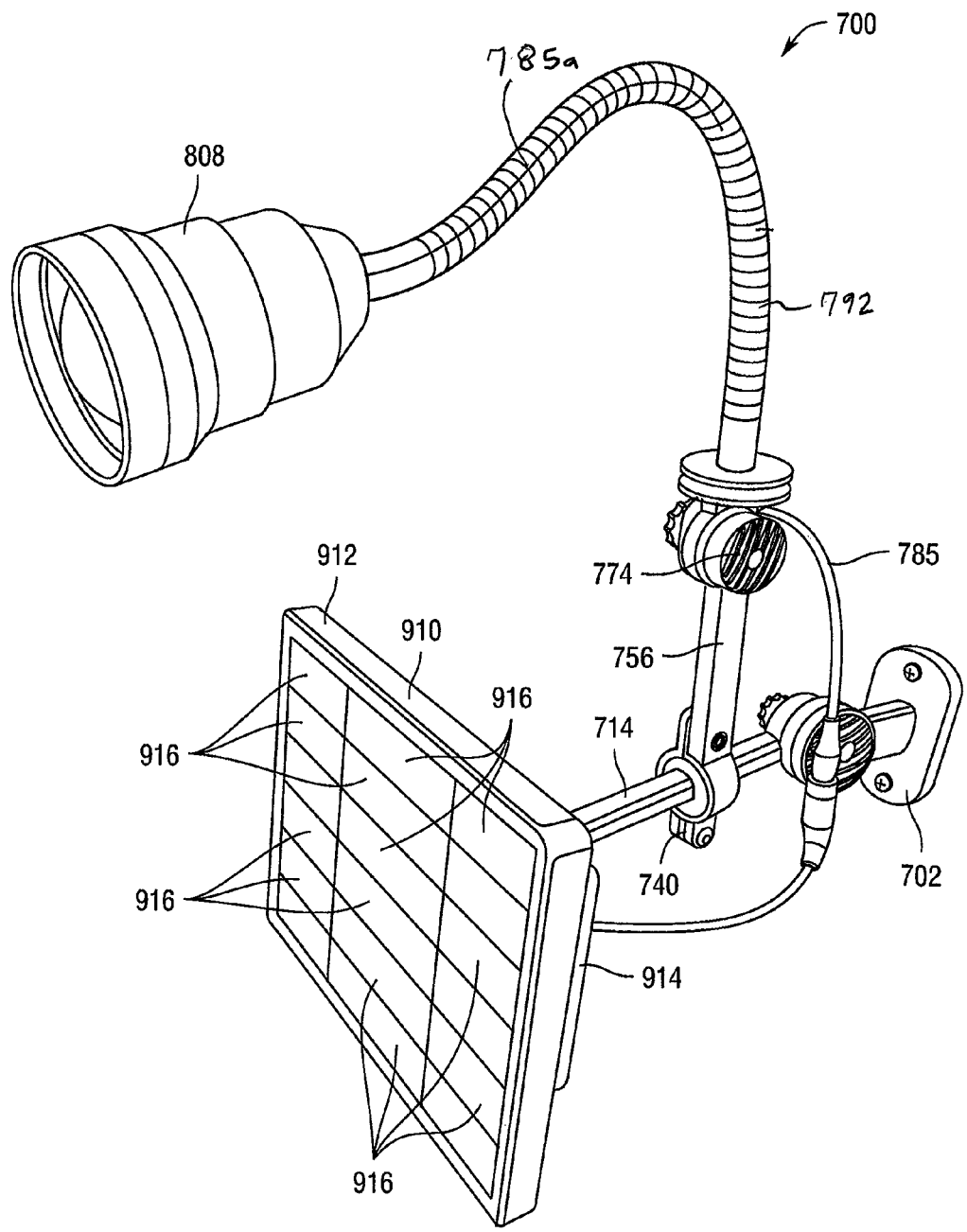
FIG. 32 is a front perspective view of the flexible lighting assembly.
Figure 33:
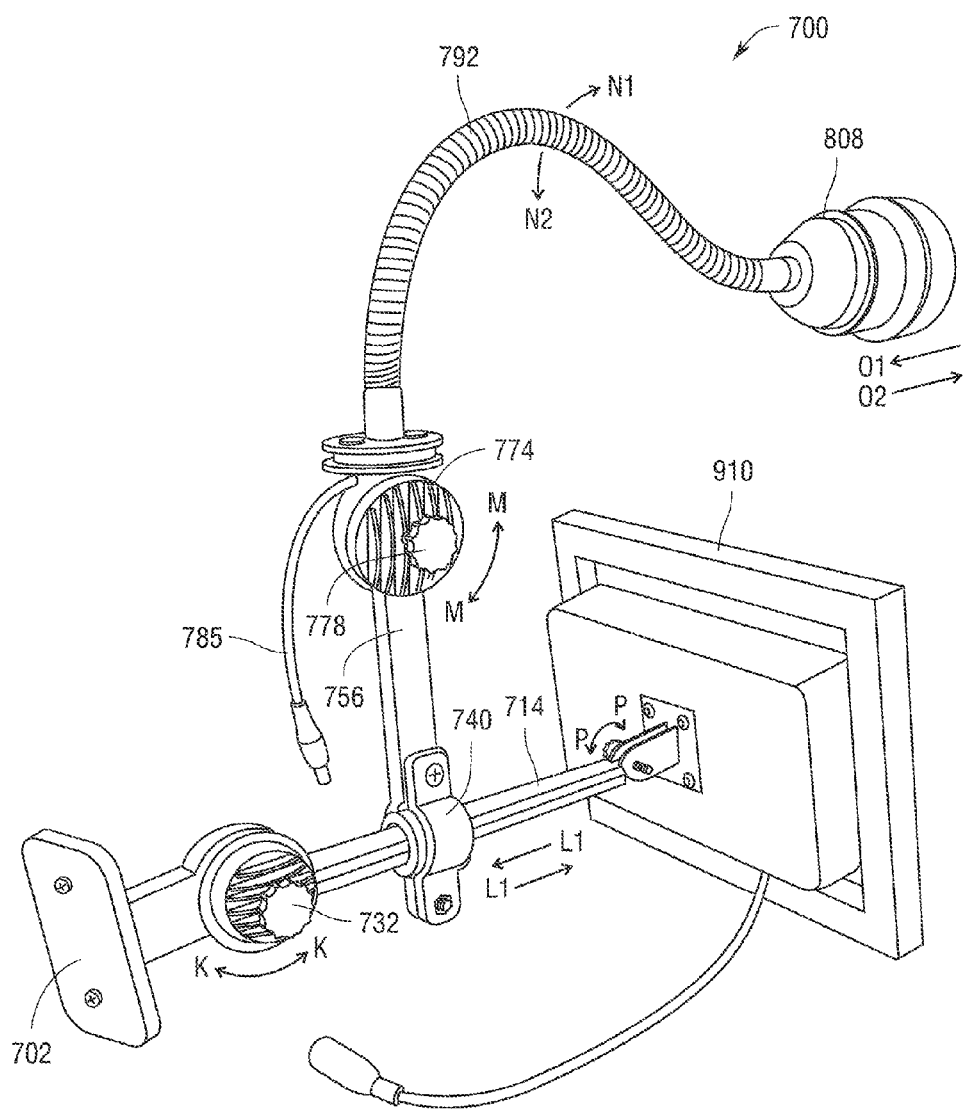
FIG. 33 is a rear perspective view of the flexible lighting assembly.
Figure 34:
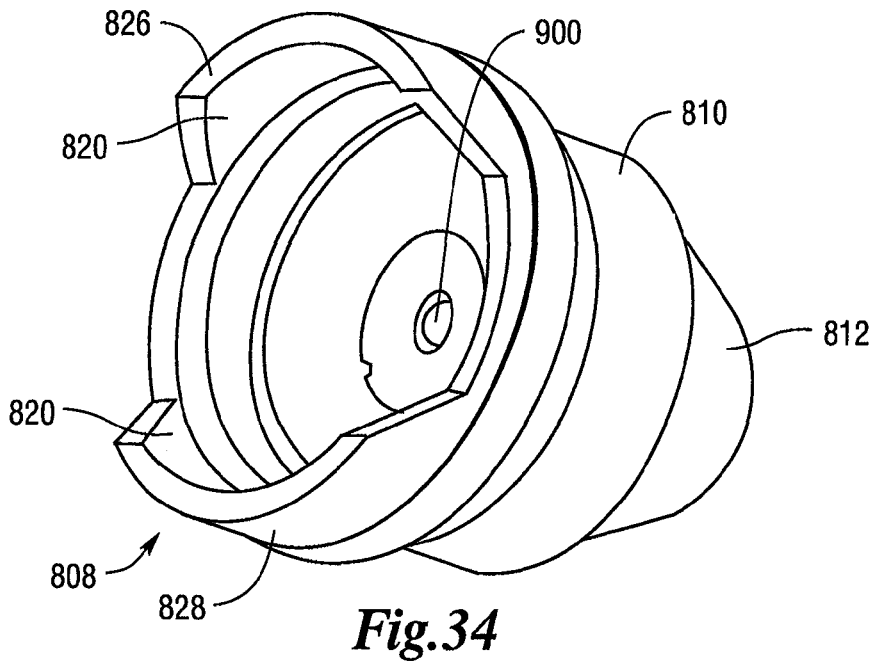
FIG. 34 is a front view of a telescopic lighting assembly of the flexible lighting assembly.

In another preferred embodiment and as shown in FIGS. 31-33 there is a flexible lighting assembly 700. As will be described presently, the flexible lighting assembly 700 is capable of being adjusted into a virtually limitless number of possible configurations. Turning now to FIG. 31, the flexible lighting assembly 700 includes an assembly mount 702 having a mount base 702 and a mount arm 704 that extends from the mount base 702. The mount base 702 defines mount openings 706 that are adapted to receive fasteners therein such that the assembly mount 702 can be mounted to virtually any surface (not shown) capable of receiving fasteners, for example a wall, a tree, a post, a ceiling, a roof or an awning. A distal end 708 of the mount arm 704 has a toothed mount attachment head 710 having mount head teeth 711 and it defines a toothed mount head opening 712. The assembly mount 702 may comprise plastics, wood, fiberglass, metals, and combinations thereof.

The flexible lighting assembly 700 also includes a slider bar 714 having a proximal slider bar end 716 and an opposed distal slider bar end 718. Formed at the proximal slider bar end 716 is a toothed slider head 720 that defines a toothed slider head opening 721 and that has plurality of slider head teeth 722. The distal slider bar end 718 includes a connecting portion 724 having a connector extension 726, and the connector extension 726 defines a connector extension opening 728. The slider bar 714 has an elongated slider bar portion 730 that extends from the toothed slider head 720 and is integrally formed therewith to the connecting portion 724 and is integrally formed therewith. The slider head teeth 722 are capable of meshing with the mount head teeth 711. When the toothed slider head 720 is adjusted or rotated (clockwise or counterclockwise) relative to the toothed mount attachment head 710 (as indicated by the arrow designated K-K in FIG. 32) the desired amount the slider head teeth 722 are meshed with the mount head teeth 711. A threaded slider fastener 732 extends through the toothed mount head opening 712 and the toothed slider head opening 721 and tightened. To allow for this the toothed mount attachment head 710 has an internal thread 713 that defines the toothed mount head opening 712, and the threaded slider fastener 732 is treaded to the internal thread 713. In addition, it is pointed out that the elongated slider bar portion 730 has a hexagonal-shaped exterior surface 734 in one in the preferred embodiments, that is, the elongated slider bar portion is has six sides, such that the cross section of the elongated slider bar portion 730 has is hexagonal shaped. In other preferred embodiments the elongated slider bar portion 730 may have different numbers of sides without limitation, for example it may have four or five sides or may be cylindrical.

The flexible lighting assembly 700 also includes a slider 740 having slider body portion 742 that define a slider opening 746. In particular, the slider 740 has six internal slider walls 744 that are arranged to form the shape of a hexagon such that the slider opening 746 has is hexagonal shaped. The slider 740 is fitted on elongated slider bar portion 730. When so fitted on the elongated slider bar portion 730 the internal slider walls 744 are capable of abutting against and sliding along the hexagonal-shaped exterior surface 734 of the elongated slider bar portion 730 (as indicated by the arrows designated L1-L2 in FIG. 33). Extending from the slider body portion 742 are opposed first and second slider arms 747, 748, and the first and second slider arms 747, 748 define slider arm openings 750, 752, respectively, for receiving slider fasteners 754. In addition, the slider 742 has oppositely facing first and second convex exterior slider surfaces 741, 743.

The flexible lighting assembly 700 also includes a light support arm 756 having opposed first and light support arm ends 758, 760 and an elongate light support arm portion 757. The elongate light support arm portion 757 has an integral channel portion 762 that defines a channel recess 764 that has a concave inner surface 766. The light support arm 756 defines first and second light support arm openings 759, 761. The light support arm 756 also has a light arm mount head 768 formed integral with the elongate light support arm portion 757, and light arm mount head 768 the disposed at the second light support arm end 760. The light arm mount head 768 is formed with light mount head teeth 770 and a light arm mount head opening 772 extends through the light mount arm head 768. The light arm head opening 772 has an internal thread 773 in one of the preferred embodiments.

As shown in FIG. 32 the light support arm 756 is supported on the slider 740. In particular, the second convex exterior slider surface 743 is moved into contact with the concave inner surface 766 of the channel portion 762 of the light support arm 757 such that they abut one another. The slider fasteners 754 are moved into the slider arm openings 750, 752 and into the first and second light support arm openings 759, 761 and loosely tightened, thus holding the slider 740 and light support arm 756 together. The user may then move the slider 740 to the desired location on the slider bar 714 and tighten the slider fasteners 754, fixing the position of the light support arm relative to the slider bar 714. It is pointed out that when the slider fasteners 754 are tightened the channel portion 762 of the light support arm 756 and the slider 740 compress on the slider bar 714 to hold and fix the location of the slider 740. Thus, the slider 740 may be adjusted and slid to virtually any location along the slider bar 714 and clamped to the slider bar 714 by tightening the slider fasteners 754.

The flexible lighting assembly 700 also includes a central support member 774 that has central support member teeth 776. The central support member 774 also has a central support mount 780 that defines central support mount openings 782 and a wire opening 783. The central support member 774 also includes a connecting cord 785 that extends therefrom and the connecting cord 785 has a cord end 784 to which is connected a plug 786. The central support member 774 also defines a central support fastener opening 775.

The central support member 774 is adjusted to a desired position relative to the light arm mount head 768. In particular, the central support member 774 and light arm mount head 768 are brought together and rotated clockwise or counterclockwise as indicated by arrow M-M in FIG. 33. When the desired position is achieved the central support member teeth 776 are meshed with the light mount head teeth 770. A central support member fastener 778 extends through the central support fastener opening 775 defined in the central support member 774 and into the light arm mount head opening 772, and the central support member fastener 778 is threaded to the internal thread 773 of the light arm head mount 768, as shown in FIG. 33. It is pointed out that the central support member 774 can thus be adjust to any desired position relative to the light arm mount head 768 prior to tightening the central support member fastener 778.

The flexible lighting assembly 700 also has a flexible member 792 having first and second flexible member ends 794, 796, and a connector hub 798 is joined to the first flexible member end 794. The flexible member 792 defines a flexible member interior 793, and the first and second flexible member ends 794, 796 define flexible member openings 795, 797 that lead to the flexible portion interior 793. The first flexible member end 794 is joined to the connector hub 798 that has a flange 800 with flange openings 802. Flange screws 804 are provided and are threaded to the central support mount openings 782, thus connecting the flange 800 and the central support member 774. It is pointed out that the flexible member 792 may bent and adjusted to any desired position and will remain in that position until the user adjusts it again. The flexible member 792 may be made of flexible metal conduit or flexible plastic conduit and other suitable flexible conduits that are well known to those having ordinary skill in the art. In addition, the flexible conduit may be adjusted to any desired position as indicated by the arrows N1 and N2 in FIG. 33. Flexible conduits made of plastics or metals and that remains in a fixed position after having been deformed are well known to those having ordinary skill in the art and therefore is not described in greater detail herein.

A shown in FIGS. 31, 34-36, flexible lighting assembly 700 also has a telescopic lighting assembly 808 for producing light and that is connected to the second flexible member end 796. A power cord 809 extends through the flexible member interior 793, through the connector hub 798, and into the central support member 774 where it is connected to the above-described connecting cord 785. Connecting electric cords is well known to those having ordinary skill in the art and therefore will not be described in greater detail herein. Alternatively, the power cord 809 and the connecting cord 785 may be embodied as a continuous power cord 785a (shown in dashed line in FIG. 31) that is one piece and that extends from the plug 786, through the central support member 774, through the connector hub 798, through the flexible portion interior 793 and connects to the telescopic lighting assembly 808 in order to provide power to the telescopic lighting assembly 808.

Figure 35:
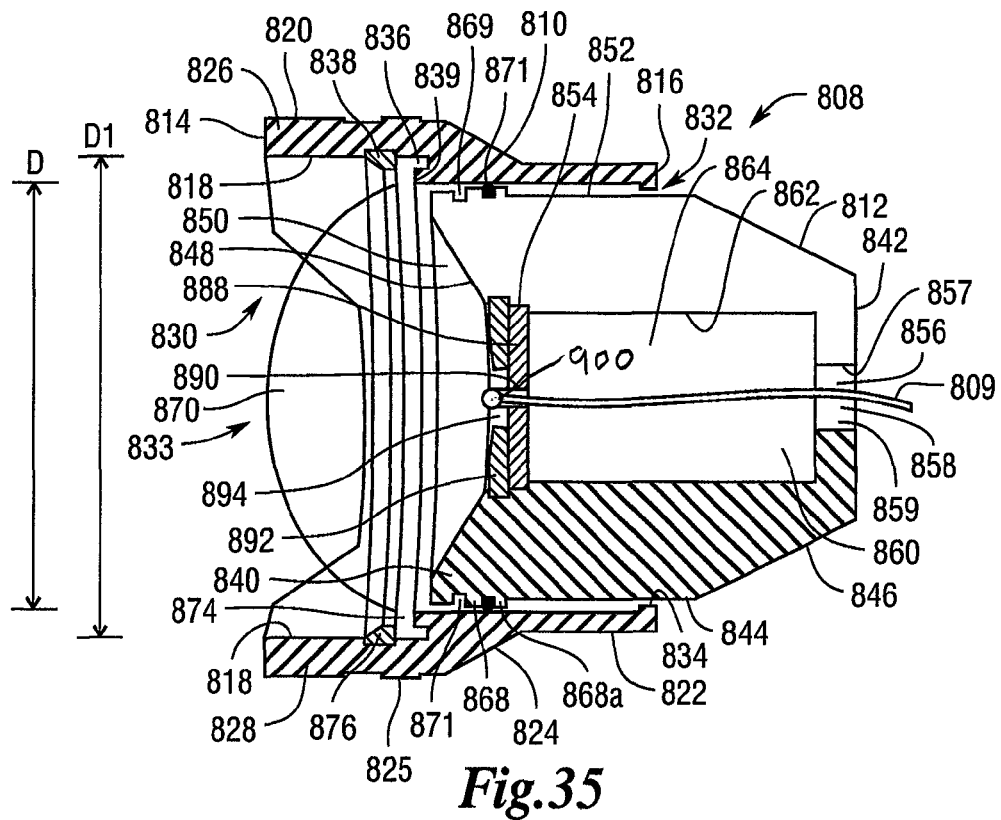
FIG. 35 is a sectional view of the telescopic lighting assembly of the flexible lighting assembly.

As shown in FIG. 35, the telescopic lighting assembly 808 has an outer housing 810 and an inner element 812 and the inner element 812 is received in the in the outer housing 810. As shown in FIG. 35 the outer housing 810 opposed first and second outer housing ends 814, 816 and an opposed inner and outer housing surfaces 818, 820. The outer housing 810 has a first portion 822 that extends to and integrally formed with a tapered portion 824, that extends to and is integrally formed with an enlarged portion 825, that extends to and is integrally formed with first and second outer housing extensions 826, 828. The outer housing 810 has opposed first and second openings 830, 832 and defines an outer housing cavity 833. The first opening 830 has an inner diameter (designated D) that is less than inner diameter (designated D1) of the outer housing extensions 826, 828. Extending from the inner housing surface 818 of the first cylindrical portion 822 and proximal the second outer housing end 816 is an annular catch lip 834. The outer housing 810, and in particular the enlarged portion 825 of the outer housing 818 defines first and second internal annular recesses 836, 838. The first annular recess 836 is defined, in part, by an internal annular lens support 839. The outer housing 810 is made of metal in one of the preferred embodiments, but may be made of plastics and other suitable materials.

The inner element 812 has opposed first and second element ends 840, 842 and a first inner element cylindrical portion 844 that meets with the first element end 840 and meets with a inner element tapered portion 846. The first element end 840 extends to a recess surface 848 such that the first element end 840 defines a first element end recess 850. The inner element 812 further includes internal first and second annular steps 852, 854, with the first internal annular step 852 having a greater diameter than the second internal annular step 854. That is, the second internal annular step 854 is recessed relative to the first internal annular step 852. The second element end 842 defines a wire opening 856 that leads to a wire passage 858 defined in the inner element 812. The wire passage 858 is defined by a surrounding wire passage wall 859. The wire passage 858 leads to an inner element central recess 860 that is defined by central recess surrounding wall 862.

Thus, the inner element 812 has a through passage 864 that is defined by the recess surface 848, the first and second internal annular steps 852, 854, the central recess surrounding wall 862, and the wire passage 858. In addition, extending from the first inner element cylindrical portion 844 are spaced apart first and second annular rings 868, 868*a* that that together define an O-ring recess 869. An O-ring 871 is provided and is fitted in O-ring recess 869.

Figure 36:
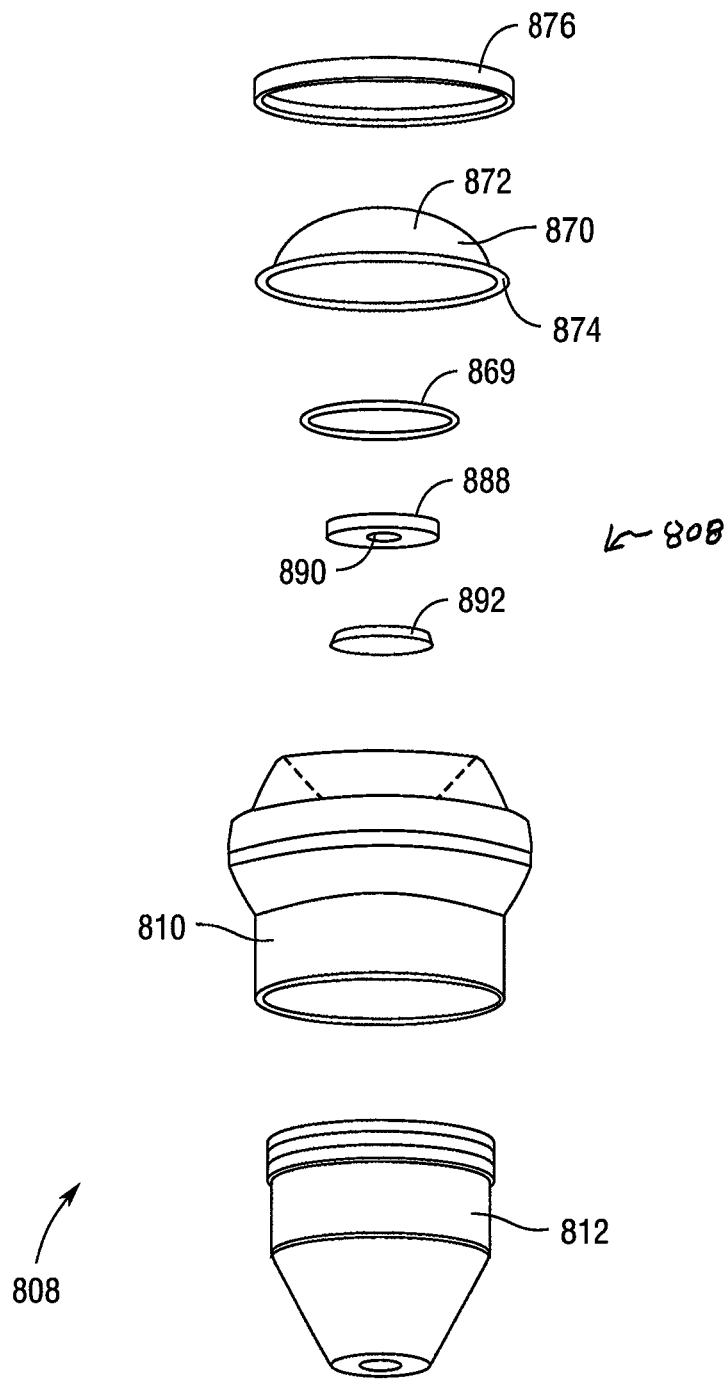
FIG. 36 is an exploded view of the telescopic lighting assembly of the flexible lighting assembly.

As shown in FIGS. 35 and 36, a convex lens 870 having a lens portion 872 and an annular flange portion 874 is provided. The lens 872 is disposed in the outer housing 810 such that the annular flange portion 874 abuts against the internal annular lens support 839. The lens 872 is convex in one of the preferred embodiments as shown. An annular locking ring 876 is provided and the annular locking ring is disposed in the second internal annular recesses 838 and is held therein, thus securing the convex lens 870 in place in the outer housing 810. In addition, a first support plate 888 having a support plate opening 890 is fitted in the second annular step 854. A second support plate 892 having a second support plate opening 894 is fitted in the first annular step 852.

The power cord 809 extends through the wire opening 856, the wire passage 858, the inner element central recess 860, support plate opening 890 in the first support plated 888. The power cord 890 is connected to a light generating device 900 that is disposed in the second support plate opening 894 of the second support plate 892. It is pointed out that the light generating device 900 is embodied as light emitting diode (LED) in one of the preferred embodiments, and in another preferred embodiment is embodied as an LED provided by and commercially available from Cree, Inc., 4600 Silicon Drive, Durham, N.C., 27703, USA.

When assembled the telescopic lighting assembly 808 is capable of being adjusted by a user. In particular, outer housing 810 is movable relative to the inner element 812 as the inner element 812 is connected to the flexible member 792. The outer housing 810 can slid and be moved toward and away from the inner element 812 as indicated by the arrows designated O1 and O2 in FIG. 32. This allows the user to focus the light being emitted by the LED, thus making the light beam narrower or wider as desired. It addition, the outer housing 810 is prevented from separating from the inner element 812. In particular, the second annular ring 868*a* of the inner element 812 is capable of abutting the annular catch lip 834 of the outer housing 812, thus preventing the outer housing from sliding off the inner element 812.

As shown in FIG. 31, the flexible lighting assembly 700 also includes a solar unit assembly 910 that includes a solar panel component 912 that is joined to a battery housing 914. As shown in FIG. 32 the solar panel component 912 includes eighteen solar panels (commonly designated by reference number 916) that are connected to a rechargeable battery 92*a* (shown in dashed lines in FIG. 31) that is disposed in the battery housing 914 and for storing energy collected by the solar panels 916. In other preferred embodiments there may be more or less than eighteen solar panels 916, and in one of the preferred embodiments there are a plurality of rechargeable batteries 92*a*. The batteries are rechargeable lithium ion type batteries in one of the preferred embodiments. Rechargeable lithium ion and similar type lithium batteries are well known to those having ordinary skill in the art and are therefore not described in greater detail herein. Wiring batteries to solar panels is well known in the art and is therefore not described in greater detail herein.

Extending from and connected to the battery housing 914 is a connection bracket 920. The connection bracket 920 has a connection member base 922 from which extend first and second bracket arms 924, 926. The connection member base 922 defines connection member base openings 928, and the first and second bracket arms 924, 926 define first and second bracket member openings 930, 932, respectively. Connection bracket fasteners 934 extend through the connection member base openings 928 and are threaded to the battery housing 920 thus securing the connection bracket 920 to the battery housing 914. The previously described slider bar 714 is connected to the connection bracket 920. In particular, the connector extension 726 of the slider bar 714 is disposed between the first and second bracket arms 924, 926 such that the first and second bracket member openings 930, 932 are aligned with the connector extension opening 728. A connector fastener 940 is then inserted in the first and second bracket member openings 930, 932 and the connector extension opening 728, thus connecting the slider bar 714 and a solar unit assembly 910. The solar unit assembly 910 may be adjusted relative to the slider arm 714 prior to tightening the connector fastener 940 and fixing the position of the solar unit assembly 910 relative to the slider arm 714. In particular, the solar unit assembly 910 may be adjusted or rotated (clockwise or counterclockwise) relative to the slider bar 714 (as indicated by the arrow designated P-P in FIG. 32).

The a solar unit assembly 910 has a solar unit cord 950 having a solar unit socket 952 that is adapted to be fitted in the a plug 786 of the connecting cord 785. Thus, the solar unit assembly 910 is capable delivering power to the telescopic light assembly 808 by way of the solar unit cord 950, the connecting cord 785, and the power cord 809. It is pointed out that the solar unit socket 952 may be used to power devices requiring electric power.

It will be appreciated by those skilled in the art that while the illumination device 10, the illumination apparatus 298, the supported illumination device 499, the spike supported illumination device 599, and the flexible lighting assembly 700 have been described in detail herein, the invention is not necessarily so limited and other examples, embodiments, uses, modifications, and departures from the embodiments, examples, uses, and modifications may be made without departing from the illumination device 10, the illumination apparatus 298, the supported illumination device 499, the spike supported illumination device 599, and the flexible lighting assembly 700 and all such embodiments are intended to be within the scope and spirit of the appended claims.

What is claimed:

1. A flexible lighting assembly comprising:
   an assembly mount and a slider bar and the slider bar is adjustable relative to the assembly mount and the assembly mount and the slider bar are connected after being adjusted;
   a slider supported on the slider bar and is capable of being moved along the slider bar;
   a light support arm supported on the slider and the light support arm extends from the slider and the position of the slider on the slider bar is capable of being fixed;
   a central support member connected to the light support arm and the central support member is connected to a flexible member and the central support member is adjustable relative to the light support arm;
   a telescopic lighting assembly connected to the flexible member and the telescopic lighting assembly has a light generating device;
   a solar unit assembly is connected to the slider bar and wired to the light generating device for providing power to the light generating device, and wherein the solar unit assembly is adjustable relative to the slider bar and the solar unit assembly has a solar unit cord with a solar unit socket and, wherein the assembly mount has a mount base and a mount arm extending from the mount base to a toothed mount attachment head having mount head teeth, and wherein the toothed mount attachment head defines a toothed mount head opening.

2. The flexible lighting assembly according to claim 1 wherein the slider bar has a proximal slider bar end and an opposed distal slider bar end, a toothed slider head having a plurality of slider head teeth is formed at the proximal slider bar end, and the toothed slider head defines a toothed slider head opening such that the mount head teeth and the plurality of slider head teeth are capable of being adjusted relative to one another and meshing, and wherein a slider fastener extends through the toothed mount head opening and the toothed slider head opening in order to hold the toothed mount attachment head and the toothed slider head together.

3. The flexible lighting assembly according to claim 2 wherein the slider bar has an elongated slider bar portion and the slider has a slider opening and the slider is fitted on the elongated slider bar portion such that the slider and the light support arm are movable along the slider bar.

4. The flexible lighting assembly according to claim 1 wherein the light support arm has opposed first and second light support arm ends and has an elongate light support arm portion having an integral channel portion that defines a channel recess that is adapted to receive the slider therein and wherein the elongate light support arm is joined to the slider with slider fasteners.

5. The flexible lighting assembly according to claim 4 wherein the light support arm has a light arm mount head that defines a light head mount head opening and has light mount head teeth, and the central support member has central support member teeth such that the central support member teeth are capable of meshing with the light mount head teeth when the central support member is adjusted to a desired position relative to the light arm mount head, and wherein a cord having a plug extends from the central support member.

6. The flexible lighting assembly according to claim 5 wherein the central support member defines a central support fastener opening, and a central support member fastener is disposed in the light head mount head opening and the central support fastener opening such that when the central support member teeth are meshed with the light mount head teeth they are held in place by the central support member fastener.

7. The flexible lighting assembly according to claim 1 wherein the flexible member has first and second flexible member ends and a connector hub is joined to the first flexible member end and connected to the central support member, and the flexible member defines a flexible member interior and a power cord extends though the flexible member interior.

8. The flexible lighting assembly according to claim 7 wherein the telescopic lighting assembly is connected to the second flexible member end and the power cord extends from the telescopic lighting assembly through the flexible member interior and to the connector hub and extends into the central support member where the power cord connects to a connecting cord and the connecting cord has a plug for delivering power to the telescopic lighting assembly.

9. The flexible lighting assembly according to claim 8 wherein the telescopic lighting assembly has an outer housing having an inner housing surface and opposed first and second outer housing ends, the outer housing defines an outer housing cavity and has an annular catch lip at the second outer housing end, and the outer housing defines first and second internal annular recesses.

10. The flexible lighting assembly according to claim 9 further including a lens having an annular flange portion that is disposed in the outer housing such that the annular flange portion is disposed in the first internal annular recess in the outer housing and an annular locking ring is provided and is disposed in the second internal annular recess to secure the lens in place.

11. The flexible lighting assembly according to claim 10 wherein the telescopic lighting assembly further includes an inner element that is disposed in the in outer housing cavity, the inner element has opposed first and second element ends and has a first inner element cylindrical portion that meets with the first element end and meets with an inner element tapered portion, and the first element end defines a first element end recess, and wherein the inner element includes internal first and second annular steps with the first internal annular step having a greater diameter than the second internal annular step, and wherein the second element end defines a wire opening that leads to an inner element central recess defined in the inner element and wherein the annular catch lip retains the inner element in the outer housing.

12. The flexible lighting assembly according to claim 11 further including spaced apart first and second annular rings that extend from the first inner element cylindrical portion that together define an O-ring recess, and an O-ring is disposed in the O-ring recess such that the O-ring abuts against the inner element and the inner housing surface of the outer housing.

13. The flexible lighting assembly according to claim 12 further including a first support plate having a support plate opening, the first support plate fitted in the second annular step of the inner element and a second support plate having a second support plate opening fitted in the first annular step of the inner element and the power cord extends through the support plate opening and the inner element to a light generating device, and wherein the light generating device is connected to the power cord.

14. The flexible lighting assembly according to claim 13 wherein the outer housing is movable relative to the inner element such that the lens is movable toward and away from the light generating device is movable toward and away from the lens to adjust the light emitted from the light generating device.

15. The flexible lighting assembly according to claim 1 wherein the solar unit assembly includes a solar panel component having a solar panel and a rechargeable battery, the solar panel is joined to a battery housing with a connection bracket extending from the battery housing, and the connection bracket is connected to the slider bar such that the solar panel component is adjustable relative to the slider bar, and wherein a plug of a connecting cord is plugged into the solar unit socket.

16. A flexible lighting assembly comprising:
an assembly mount connected to a slider bar and the slider bar is adjustable relative to the assembly mount;
a slider supported on the slider bar and the slider is capable of being moved along the slider bar;
a light support arm that is supported on and extends from the slider such that the light support arm is adjustable relative to the slider bar;
a central support member connected to the light support arm and connected to a flexible member such that the central support member is adjustable relative to the light support arm and the flexible member is adjustable relative to the central support member;

a telescopic lighting assembly connected to the flexible member and the telescopic lighting assembly has an outer housing having an inner housing surface, and the outer housing supports a lens and defines an outer housing cavity, and an inner element is disposed in the outer housing cavity and the inner element supports a light generating device, and wherein the outer housing is movable relative to the inner element; and, a solar unit assembly connected to the slider bar for providing power to the telescopic lighting assembly and the solar unit assembly is adjustable relative to the slider bar.

17. A method for lighting comprising the acts of:

providing an assembly mount and a slider bar and moving the slider bar relative to the assembly mount and securing the slider bar to the assembly mount;

providing a slider and supporting the slider on the slider bar and moving the slider relative to the slider bar and securing the slider to the slider bar;

providing a light support arm and supporting the light support arm on the slider such that the light support arm extends from the slider;

providing a central support member and adjusting the central support member relative to the light support arm and securing the central support member to the light support arm;

providing a flexible member and securing the flexible member to the central support member such that the flexible member is capable of being moved relative to the central support member;

providing a telescopic lighting assembly and connecting the telescopic lighting assembly to the flexible member such that the telescopic lighting assembly can be adjusted relative to the central support member, and providing the telescopic lighting assembly with an outer housing having an inner housing surface, and supporting a lens on the outer housing, and defining an outer housing cavity in the outer housing, and providing an inner element and disposing the inner element in the outer housing cavity, and supporting a light generating device on the inner element, and wherein the outer housing is movable relative to the inner element; and, providing a solar unit assembly and connecting the solar unit assembly to the slider bar and wiring the solar unit assembly to the telescopic lighting assembly and adjusting the solar unit assembly relative to the slider bar and securing the solar unit assembly in place relative to the slider bar.

18. The method for lighting according to claim 17 further including the act of providing the light generating device to be in the form of a light emitting diode and providing the solar unit assembly with a solar panel and with a rechargeable battery for storing energy delivered from the solar panel.

* * * * *